(12) United States Patent
Zhu et al.

(10) Patent No.: US 12,531,054 B2
(45) Date of Patent: Jan. 20, 2026

(54) TEXT TIME ANNOTATION METHOD AND APPARATUS, ELECTRONIC DEVICE, AND READABLE STORAGE MEDIUM

(71) Applicant: Petal Cloud Technology Co., Ltd., Dongguan (CN)

(72) Inventors: Yicheng Zhu, Nanjing (CN); Weizheng Han, Nanjing (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 275 days.

(21) Appl. No.: 18/007,450

(22) PCT Filed: Jul. 22, 2021

(86) PCT No.: PCT/CN2021/107987
§ 371 (c)(1),
(2) Date: Jan. 30, 2023

(87) PCT Pub. No.: WO2022/022395
PCT Pub. Date: Feb. 3, 2022

(65) Prior Publication Data
US 2023/0282204 A1   Sep. 7, 2023

(30) Foreign Application Priority Data
Jul. 30, 2020 (CN) .......................... 202010752345.8

(51) Int. Cl.
*G10L 15/04* (2013.01)
*G06F 40/169* (2020.01)
(Continued)

(52) U.S. Cl.
CPC ............ *G10L 15/04* (2013.01); *G06F 40/169* (2020.01); *G10L 15/05* (2013.01); *G10L 15/22* (2013.01);
(Continued)

(58) Field of Classification Search
CPC ... G10L 15/05; G10L 15/04; G10L 2015/088; G10L 25/78; G10L 25/87; G06F 16/685; G06F 16/683
See application file for complete search history.

(56) References Cited

U.S. PATENT DOCUMENTS 9,305,530 B1 * 4/2016 Durham .................. G10L 25/45
11,245,950 B1 * 2/2022 Mahar ..................... G10L 15/26
(Continued)

FOREIGN PATENT DOCUMENTS

CN   109102800 A   12/2018
CN   109697973 A   4/2019

OTHER PUBLICATIONS

Chien et al., "Alignment of lyrics with accompanied singing audio based on acoustic-phonetic vowel likelihood modeling." IEEE/ACM Transactions on Audio, Speech, and Language Processing 24.11 (Year: 2016).*
(Continued)

*Primary Examiner* — Samuel G Neway
(74) *Attorney, Agent, or Firm* — SLATER MATSIL, LLP

(57) ABSTRACT

In an embodiment a method includes receiving, by an electronic device, an annotation request, wherein the annotation request is used to request to annotate a playing start-end time period of each text unit in a text corresponding to a target audio, and wherein a text unit is at least a character, a word, or an expression, obtaining, by the electronic device, the playing start-end time period of each text unit in the target audio based on a fundamental frequency of the target audio, obtaining, by the electronic device, an annotation file based on annotating the playing start-end time period of each text unit in the text based on the playing start-end time period of each text unit in the target audio and outputting, by the electronic device, the annotation file.

19 Claims, 13 Drawing Sheets

(51) Int. Cl.
  *G10L 15/02* (2006.01)
  *G10L 15/05* (2013.01)
  *G10L 15/22* (2006.01)
  *G10L 15/30* (2013.01)
  *G10L 21/028* (2013.01)
  *G10L 25/21* (2013.01)
  *G10L 25/51* (2013.01)
  *G10L 25/78* (2013.01)
  *G10L 25/93* (2013.01)
  *G11B 27/10* (2006.01)

(52) U.S. Cl.
  CPC ............ *G10L 15/30* (2013.01); *G10L 21/028* (2013.01); *G10L 25/21* (2013.01); *G10L 25/51* (2013.01); *G10L 25/78* (2013.01); *G10L 15/02* (2013.01); *G10L 2015/025* (2013.01); *G10L 2025/783* (2013.01); *G10L 2025/932* (2013.01); *G11B 27/10* (2013.01)

(56) References Cited

U.S. PATENT DOCUMENTS

| | | | | |
|---|---|---|---|---|
| 2002/0010575 | A1* | 1/2002 | Haase | G10L 25/87 704/E11.005 |
| 2002/0163533 | A1* | 11/2002 | Trovato | H04N 7/163 715/728 |
| 2005/0228663 | A1* | 10/2005 | Boman | G10L 15/26 704/235 |
| 2006/0112812 | A1* | 6/2006 | Venkataraman | G10L 15/26 704/E15.045 |
| 2007/0166683 | A1* | 7/2007 | Chang | G09B 5/06 434/307 R |
| 2008/0097754 | A1* | 4/2008 | Goto | G10L 15/26 704/214 |
| 2009/0005890 | A1* | 1/2009 | Zhang | G11B 27/28 700/94 |
| 2009/0120269 | A1* | 5/2009 | Korst | G10H 1/0008 84/609 |
| 2011/0288862 | A1* | 11/2011 | Todic | G10L 15/05 704/235 |
| 2012/0046772 | A1* | 2/2012 | Dickins | G10L 25/78 700/94 |
| 2013/0262096 | A1* | 10/2013 | Wilhelms-Tricarico | G10L 13/04 704/207 |
| 2013/0268826 | A1* | 10/2013 | Nowakowski | G06F 40/197 715/203 |
| 2020/0135176 | A1* | 4/2020 | Stoller | G06F 17/16 |
| 2023/0282204 | A1* | 9/2023 | Zhu | G10L 15/22 |

OTHER PUBLICATIONS

Chi Hang Wong et al., "Automatic lyrics alignment for Cantonese popular music", Mul Timedia Systems, Springer Berlin, DE, vol. 12, No. 4-5, Sep. 12, 2006 (Sep. 12, 2006), pp. 307-323, XP019492688.

* cited by examiner

TEXT TIME ANNOTATION METHOD AND APPARATUS, ELECTRONIC DEVICE, AND READABLE STORAGE MEDIUM

This application is a national stage of International Application No. PCT/CN2021/107987, filed on Jul. 22, 2021, which claims priority to Chinese Patent Application No. 202010752345.8 filed on Jul. 30, 2020. Both of the aforementioned applications are hereby incorporated by reference in their entireties.

TECHNICAL FIELD

Embodiments of this application relate to audio processing technologies, and in particular, to a text time annotation method and apparatus, an electronic device, and a readable storage medium.

BACKGROUND

When playing a song, a terminal device displays a lyric of the song, and renders a character in the displayed lyric based on a playing start-end time period of each character in the lyric in the song. Therefore, when listening to the song, a user may see the lyric rendered along with a singing progress of the song. It is critical that the terminal device can obtain the playing start-end time period of each character in the lyric, and accuracy of the playing start-end time period of each character in the lyric affects matching between a playing degree of the song and rendering of the lyric, and affects user experience.

In the conventional technology, the terminal device may convert the character in the lyric into a corresponding phoneme based on a phoneme dictionary, recognize a phoneme in audio, and align the phoneme in the audio with the phoneme into which the character in the lyric is converted. After the phonemes are aligned, the playing start-end time period of the character in the lyric may be annotated based on a time period in the audio, to obtain the playing start-end time period of each character in the lyric.

However, if the user sings several characters wrongly in the audio, a phoneme in audio of a wrongly sung part cannot be aligned with a phoneme into which a character in a corresponding lyric is converted, and alignment of a phoneme after the wrongly sung part is also affected. Consequently, an accurate playing start-end time period of each character in the lyric cannot be obtained.

SUMMARY

Embodiments of this application provide a text time annotation method and apparatus, an electronic device, and a readable storage medium. Text time annotation accuracy is high.

According to a first aspect, an embodiment of this application provides a text time annotation method. The method may be applied to an electronic device, or may be applied to a chip in the electronic device. The electronic device may be a server or a terminal device. The following describes the method by using an example in which the method is applied to the electronic device. In the method, the electronic device may receive an annotation request. When the electronic device is a server, the server may receive an annotation request from the terminal device; and when the electronic device is a terminal device, the terminal device may receive an annotation request entered by a user. The annotation request is used to request to annotate a playing start-end time period of each text unit in a text corresponding to target audio, and the text unit is at least one of the following: a character, a word, or an expression. After receiving the annotation request, the electronic device may obtain a playing start-end time period of each text unit in the target audio based on a fundamental frequency of the target audio. For example, the electronic device may obtain a first moment at which a change rate of the fundamental frequency of the target audio is greater than a change rate threshold, and further use the first moment as an interval moment between two adjacent text units in the text corresponding to the target audio. In this way, the playing start-end time period of each text unit can be obtained. For example, the first moment may be used as a playing start time point of a current text unit and a playing end time point of a next text unit.

After obtaining the playing start-end time period of each text unit in the text, the electronic device may annotate the playing start-end time period of each text unit in the text based on the playing start-end time period of each text unit in the target audio, to obtain an annotation file. For example, in this embodiment of this application, a correspondence between each text unit and a corresponding playing start-end time period may be established. The correspondence may be the annotation file. Alternatively, in this embodiment of this application, the playing start-end time period of each text unit may be added to the text of the target audio, to obtain an annotation file. The electronic device may output the annotation file. When the electronic device is a server, the server may send the annotation file to the terminal device; and when the electronic device is a terminal device, the terminal device may play the target audio, display the text corresponding to the target audio, and render and display a target text unit in the target audio based on the annotation file when the target text unit is played. It should be understood that, in this embodiment of this application, for a manner in which the terminal device renders the text unit based on the playing start-end time period of each text unit, refer to a currently existing technical solution.

In this embodiment of this application, the moment between the two adjacent text units in the text corresponding to the target audio may be recognized based on the fundamental frequency of the target audio, to distinguish between the two adjacent text units, and further align the text units. The text units are not aligned in a current text unit recognition manner, to avoid a problem that text time annotation cannot be performed when a text unit in the target audio is inconsistent with a text unit in the text corresponding to the target audio. Text time annotation accuracy is high.

When the first moment between the two adjacent text units is determined based on the fundamental frequency of the target audio, there may be a problem that a plurality of first moments are included between the two adjacent text units. Therefore, accuracy is low when the playing start-end time period of each text unit is obtained based on only the fundamental frequency of the target audio. In this embodiment of this application, to improve accuracy of obtaining the playing start-end time period of each text unit, the playing start-end time period of each text unit may be obtained based on the fundamental frequency of the target audio and short-time energy of the target audio.

The electronic device may obtain the first moment at which the change rate of the fundamental frequency of the target audio is greater than the change rate threshold, and obtain a second moment from the first moment. An average value of short-time energy between two adjacent second moments is less than a first short-time energy threshold. In this embodiment of this application, the playing start-end time period of each text unit in the target audio may be obtained based on the first moment and the second moment, to obtain the playing start-end time period of each text unit in the target audio. For example, an average value of consecutively existing second moments may be used as the playing end time point of the current text unit and the playing start time point of the next text unit.

The target audio may include a plurality of sub-audio segments. For example, one song may include a plurality of lyrics, and each lyric corresponds to one sub-audio segment. If the entire target audio is used as a whole and a playing end time point of a last character of a lyric is used as a playing start time point of a first character of a next lyric, a rendering time point of the first character of the next lyric may be too early. In this embodiment of this application, to improve accuracy of playing start-end time periods of a $1^{st}$ text and a last text in a text corresponding to each sub-audio segment, the electronic device may segment the target audio into the plurality of sub-audio segments, and obtain, based on a fundamental frequency and short-time energy of each sub-audio segment, a playing start-end time period of each text unit in the text corresponding to each sub-audio segment.

That the target audio is segmented into the plurality of sub-audio segments may be: obtaining at least one first time length in which short-time energy is less than a second short-time energy threshold in the target audio, and segmenting the target audio based on a playing moment corresponding to a second time length that is greater than a preset time length in the first time length, to obtain at least one sub-audio segment.

A method in which the electronic device obtains, based on the fundamental frequency and the short-time energy of each sub-audio segment, the playing start-end time period of each text unit in the text corresponding to each sub-audio segment is similar to a method in which the electronic device obtains the playing start-end time period of each text unit in the text based on the fundamental frequency and the short-time energy of the target audio. Specifically, the electronic device may obtain, based on the fundamental frequency of the sub-audio segment, a first moment at which a change rate of a fundamental frequency is greater than the change rate threshold in the sub-audio segment. If a quantity of first moments is greater than or equal to a quantity of text units in the text corresponding to the sub-audio segment, the second moment is obtained from the first moment based on the short-time energy of the sub-audio segment. The average value of the short-time energy between the two adjacent second moments is less than the first short-time energy threshold. The electronic device may obtain the playing start-end time period of each text unit in the sub-audio segment based on the first moment and the second moment, to obtain the playing start-end time period of each text unit in the target audio.

When the electronic device obtains the playing start-end time period of each text unit in the sub-audio segment based on the first moment and the second moment, the electronic device may obtain at least one second moment group of the sub-audio segment in an early-to-late order of a third moment and the second moment. The second moment group includes at least two consecutive second moments, and a moment adjacent to the second moment group is the third moment. The third moment is a moment other than the second moment in the first moment. In this embodiment of this application, each third moment and each second moment group each may be used as one moment unit, to obtain a plurality of moment units. If a moment in an $i^{th}$ moment unit is a third moment, the third moment in the $i^{th}$ moment unit is used as a playing end time point of the $i^{th}$ text unit and a playing start time point of an $(i+1)^{th}$ text unit in the sub-audio segment; and if the moment in the $i^{th}$ moment unit is a second moment group, an earliest second moment in the second moment group in the $i^{th}$ moment unit is used as the playing end time point of the $i^{th}$ text unit in the sub-audio segment, and a latest second moment in the second moment group in the $i^{th}$ moment unit is used as the playing start time point of the $(i+1)^{th}$ text unit in the sub-audio segment. Correspondingly, after the electronic device obtains the playing start-end time period of each text unit in each sub-audio segment, the electronic device may annotate the playing start-end time period of each text unit in the sub-audio segment in each text unit in the text corresponding to the sub-audio segment, to obtain the annotation file. Herein, i is an integer greater than or equal to 1.

Currently, a lyric of an online song is manually pre-edited, stored, and uploaded, and a lyric database usually includes the lyric of the song. For other audio of an original song, a poem, or a human voice, the database usually does not include a text corresponding to the audio. If the lyric is manually edited and uploaded, efficiency is low, and an error easily occurs. Therefore, based on the foregoing embodiment, in the text time annotation method provided in this embodiment of this application, the text corresponding to the target audio may be further recognized based on the target audio, to improve efficiency and accuracy. When the database does not include the text corresponding to the target audio, the electronic device recognizes the target audio based on the target audio by using a speech recognition technology. According to the method, a problem in which manual lyric editing efficiency is low and accuracy is low can be avoided.

It should be understood that, in this embodiment of this application, the user may upload the target audio by using the terminal device. The target audio may be audio of the human voice. When audio uploaded by the user is initial audio, the initial audio includes audio of a non-human voice and the audio of the human voice. To ensure that the fundamental frequency and the short-time energy of the target audio can be accurately obtained and a lyric in the target audio can be accurately recognized, in this embodiment of this application, the electronic device may extract the audio of the human voice from the audio uploaded by the user, and use the audio of the human voice as the target audio. A manner in which the electronic device extracts the audio of the human voice may be: The electronic device may input the audio uploaded by the user into a human voice recognition model, to obtain the audio of the human voice obtained after the audio of the non-human voice is removed. It should be noted that in this embodiment of this application, regardless of whether the audio uploaded by the user is the audio of the non-human voice or the audio of the human voice, the audio may be output to the human voice recognition model, to perform an operation of removing the audio of the non-human voice.

According to a second aspect, an embodiment of this application provides a text time annotation apparatus. The text time annotation apparatus may be the server or the terminal device in the foregoing embodiment. The text time annotation apparatus may include a transceiver module, a processing module, and an output module.

The transceiver module is configured to receive an annotation request. The annotation request is used to request to annotate a playing start-end time period of each text unit in a text corresponding to target audio, and the text unit is at least one of the following: a character, a word, or an expression.

The processing module is configured to: obtain a playing start-end time period of each text unit in the target audio based on a fundamental frequency of the target audio, and annotate the playing start-end time period of each text unit in the text based on the playing start-end time period of each text unit in the target audio, to obtain an annotation file.

The output module is configured to output the annotation file.

In a possible implementation, the processing module is specifically configured to obtain the playing start-end time period of each text unit in the target audio based on the fundamental frequency of the target audio and short-time energy of the target audio.

In a possible implementation, the target audio includes at least one sub-audio segment. The processing module is specifically configured to: obtain, based on a fundamental frequency of the sub-audio segment, a first moment at which a change rate of the fundamental frequency of the sub-audio segment is greater than a change rate threshold; if a quantity of first moments is greater than or equal to a quantity of text units in a text corresponding to the sub-audio segment, obtain a second moment from the first moment based on short-time energy of the sub-audio segment, where an average value of short-time energy between two adjacent second moments is less than a first short-time energy threshold; and obtain a playing start-end time period of each text unit in the sub-audio segment based on the first moment and the second moment, to obtain the playing start-end time period of each text unit in the target audio.

In a possible implementation, a third moment is a moment other than the second moment in the first moment. The processing module is specifically configured to: obtain at least one second moment group of the sub-audio segment in an early-to-late order of the third moment and the second moment, where the second moment group includes at least two consecutive second moments, and a moment adjacent to the second moment group is the third moment; use each of each third moment and each second moment group as one moment unit, to obtain a plurality of moment units; and obtain, in an early-to-late order of moment units, the playing start-end time period of each text unit in the sub-audio segment.

In a possible implementation, the processing module is specifically configured to: in the early-to-late order of moment units, if a moment in an $i^{th}$ moment unit is a third moment, use the third moment in the $i^{th}$ moment unit as a playing end time point of an $i^{th}$ text unit and a playing start time point of an $(i+1)^{th}$ text unit in the sub-audio segment; and if the moment in the $i^{th}$ moment unit is a second moment group, use an earliest second moment in the second moment group in the $i^{th}$ moment unit as the playing end time point of the $i^{th}$ text unit in the sub-audio segment, and use a latest second moment in the second moment group in the $i^{th}$ moment unit as the playing start time point of the $(i+1)^{th}$ text unit in the sub-audio segment.

In a possible implementation, the annotation request includes the target audio, and the target audio is audio of a human voice; or the annotation request includes initial audio, and the initial audio includes audio of a non-human voice and audio of a human voice. The processing module is further configured to: extract the audio of the human voice from the initial audio, and use the audio of the human voice as the target audio.

In a possible implementation, the processing module is specifically configured to input the initial audio into a human voice recognition model, to obtain audio of the human voice obtained after the audio of the non-human voice is removed.

In a possible implementation, the processing module is further configured to: if the annotation request includes an identifier of the target audio, query, based on the identifier of the target audio, whether a database includes the text corresponding to the target audio; or if the annotation request does not include an identifier of the target audio, query, based on an audio fingerprint of the target audio, whether a database includes the text corresponding to the target audio; and if the database does not include the text corresponding to the target audio, recognize the target audio by using a speech recognition technology, to obtain the text corresponding to the target audio.

In a possible implementation, the target audio includes the at least one sub-audio segment, and the text corresponding to the target audio includes a text corresponding to the at least one sub-audio segment. The processing module is specifically configured to annotate the playing start-end time period of each text unit in the sub-audio segment in a text corresponding to the sub-audio segment, to obtain the annotation file.

In a possible implementation, the processing module is further configured to: obtain at least one first time length in which short-time energy is less than a second short-time energy threshold in the target audio; and segment the target audio based on a playing moment corresponding to a second time length that is greater than a preset time length in the first time length, to obtain the at least one sub-audio segment.

In a possible implementation, the electronic device is a server, and the transceiver module is specifically configured to receive the annotation request from the terminal device. The output module is specifically configured to send the annotation file to the terminal device.

In a possible implementation, the electronic device is a terminal device, and the transceiver module is specifically configured to: receive a playing request that is of the target audio and that is entered by a user, where the playing request is used to request to annotate the playing start-end time period of each text unit in the text corresponding to the target audio and play the target audio; and when the target audio is played, each text unit in the text is rendered and displayed based on the playing start-end time period of each text unit in the text corresponding to the target audio.

The output module is specifically configured to: play the target audio, and display the text corresponding to the target audio; and render and display a target text unit in the target audio based on the annotation file when the target text unit is played.

An implementation principle and a technical effect of the text time annotation apparatus provided in this embodiment of this application are similar to those of the server or the terminal device in the foregoing embodiments. Details are not described herein again.

According to a third aspect, an embodiment of this application provides an electronic device. The electronic device may be the terminal device or the server in the first aspect. The electronic device includes a processor, a memory, and a transceiver. The transceiver is coupled to the processor, and the processor controls a receiving/sending action of the transceiver. The memory is configured to store computer-executable program code, and the program code includes instructions. When the processor executes the instructions, the instructions enable the electronic device to perform the method provided in the first aspect.

According to a fourth aspect, an embodiment of this application provides an electronic device, including a unit, a module, or a circuit configured to perform the method provided in the possible designs of the first aspect. The electronic device may be a terminal device or a server, or may be a module applied to the terminal device or the server, for example, may be a chip applied to the terminal device or the server.

According to a fifth aspect, an embodiment of this application provides a chip. The chip stores a computer program, and when the computer program is executed by the chip, the method provided in the first aspect is implemented.

According to a sixth aspect, an embodiment of this application provides a computer program product including instructions. When the computer program product runs on a computer, the computer is enabled to perform the method in the first aspect.

According to a seventh aspect, an embodiment of this application provides a computer-readable storage medium. The computer-readable storage medium stores instructions, and when the instructions run on a computer, the computer is enabled to perform the method in the first aspect.

Embodiments of this application provide a text time annotation method and apparatus, an electronic device, and a readable storage medium. The method includes: receiving the annotation request; obtaining the playing start-end time period of each text unit in the target audio based on the fundamental frequency of the target audio; annotating the playing start-end time period of each text unit in the text based on the playing start-end time period of each text unit in the target audio, to obtain the annotation file; and outputting the annotation file. In this embodiment of this application, the moment between the two adjacent text units in the text corresponding to the target audio may be recognized based on the fundamental frequency of the target audio, to distinguish between the two adjacent text units, and further align the text units. The text units are not aligned in a current text unit recognition manner, to avoid a problem that text time annotation cannot be performed when a text unit in the target audio is inconsistent with a text unit in the text corresponding to the target audio. Text time annotation accuracy is high.

DETAILED DESCRIPTION OF ILLUSTRATIVE EMBODIMENTS

Figure 1:
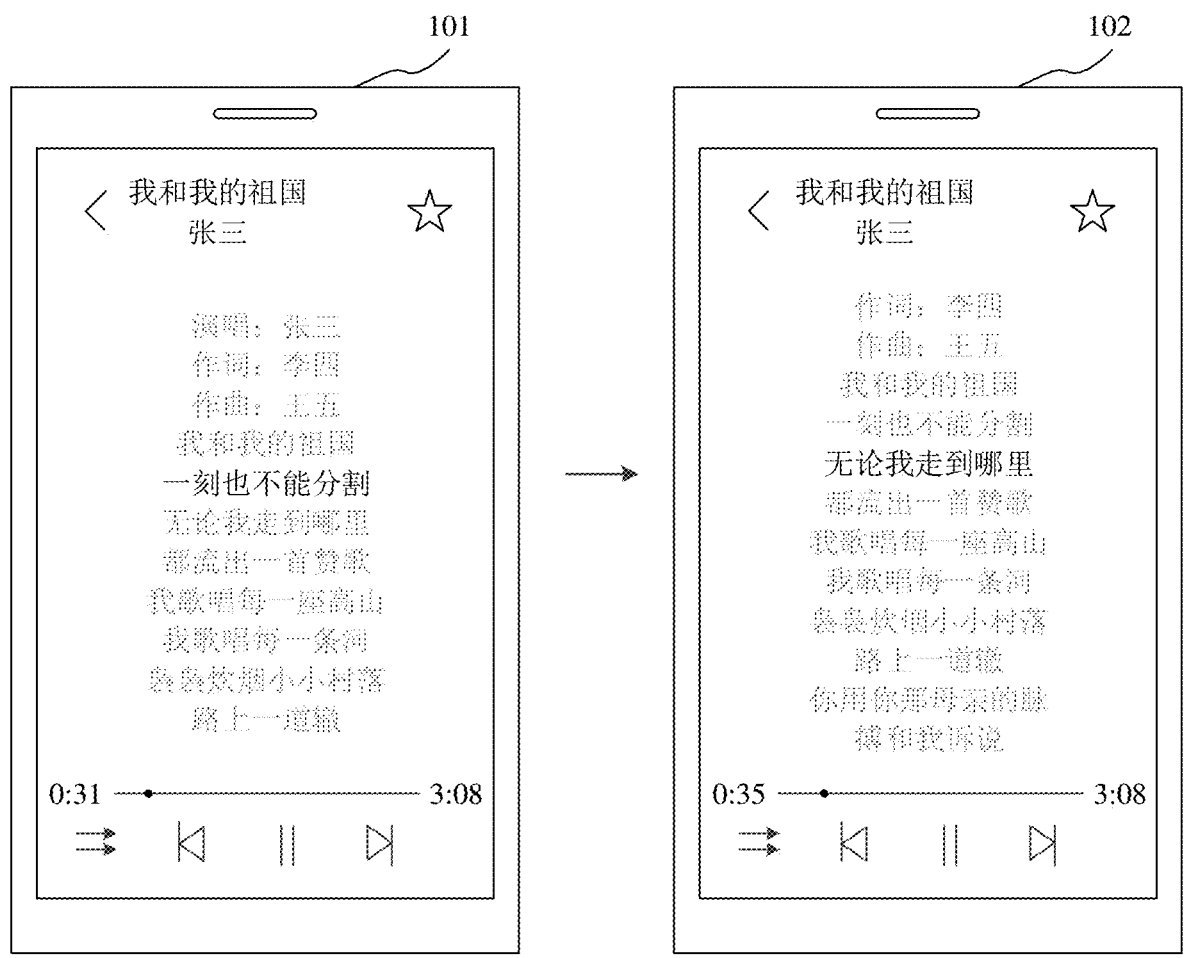
FIG. 1 is a schematic diagram of a lyric display interface.

When a user uses a terminal device to play a song, the terminal device may display a lyric of the song in an interface. FIG. 1 is a schematic diagram of a lyric display interface. As shown in FIG. 1, the terminal device displays lyrics line by line. The terminal device may store a playing start-end time period of each line of lyric, so that when the lyrics are displayed, the lyrics are flipped line by line based on the playing start-end time period of each line of lyric. As shown in an interface 101 in FIG. 1, a currently played lyric is "一刻也不能分割", and then the lyric may be displayed within the playing start-end time period of "一刻也不能分割". In the interface 101, for example, lyrics before and after the currently played lyric are displayed in gray, to distinguish between the lyrics before and after the currently played lyric and the currently played lyric. When playing a sentence "无论我走到哪里", the terminal device may flip up a previous lyric, as shown in an interface 102. A manner of displaying the lyrics line by line cannot match a playing progress of the song well, and user experience is poor. It should be understood that the playing start-end time period in this embodiment of this application may include a playing start time point and a playing end time point.

Figure 2:
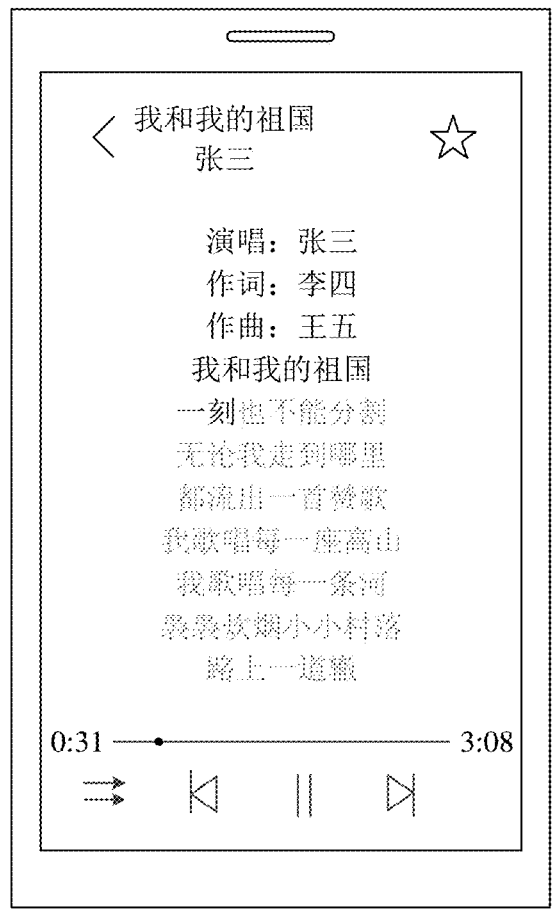
FIG. 2 is a schematic diagram of another lyric display interface.

The terminal device may render the lyrics character by character based on the playing progress of the song, to improve user experience. FIG. 2 is a schematic diagram of another lyric display interface. As shown in FIG. 2, the terminal device may display the lyrics of the song. For example, when playing "刻" in "一刻也不能分割" in the currently played song, the terminal device may render "刻", for example, deepen a color of "刻", to represent the playing progress of the current song. The terminal device needs to obtain a playing start-end time period of each character in the lyrics in advance, and then renders each character based on the playing start-end time period of each character when the song starts to be played.

Currently, an annotation person may manually annotate the playing start-end time period of each character in the lyrics. For example, the annotation person may listen to the song and record the playing start-end time period of each character in the lyrics. In addition, to improve annotation accuracy of the annotation person, the annotation person may annotate the playing start-end time period of each character in the lyrics by using a time domain diagram of the song. However, in a manual annotation manner, a large amount of labor needs to be consumed, a long time length is consumed, and accuracy is low. The time domain diagram of the song includes an audio waveform diagram in which the song changes with time.

Figure 3:
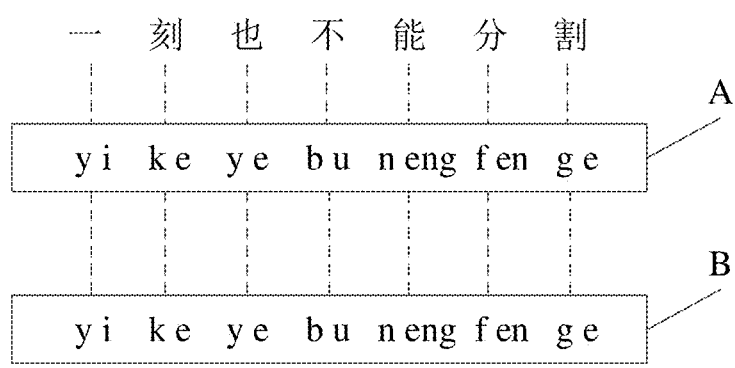
FIG. 3 is a schematic diagram of annotating a phoneme.
Figure 4:
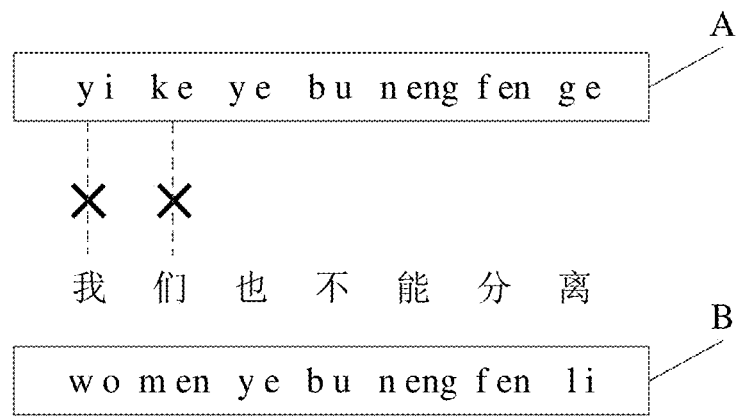
FIG. 4 is another schematic diagram of annotating a phoneme.

Currently, a method for automatically annotating the playing start-end time period of each character in the lyrics is further provided. In the method, an annotation device (for example, the terminal device) may recognize a phoneme in audio of a played song based on the audio, and the terminal device converts a character in the lyrics into a corresponding phoneme based on a phoneme dictionary. The terminal device may align the phoneme in the audio with a corresponding phoneme into which the character in the lyrics is converted, and then annotate a playing start-end time period of the character in the lyrics based on a time period in the audio, to obtain a playing start-end time period of each character in the lyrics. For example, FIG. 3 is a schematic diagram of annotating a phoneme. As shown in FIG. 3, corresponding phonemes into which the terminal device converts characters in the lyric "一刻也不能分割" are shown in A, and phonemes in the audio "一刻也不能分割" that are recognized by the terminal device are shown in B. The terminal device may align the phonemes one by one, and annotate the playing start-end time period of the character in the lyrics based on the time period in the audio. However, if the user sings the lyrics in the audio wrongly, for example, "一刻也不能分割" is sung as "我们也 不能分离". FIG. 4 is another schematic diagram of annotating a phoneme. As shown in FIG. 4, the phoneme recognized by the terminal device from the audio and the corresponding phoneme into which the character in the lyrics is converted cannot be aligned. Therefore, playing time annotation cannot be performed on the character in the lyrics. In addition, in the method, an accurate phoneme in the audio needs to be recognized. Once a phoneme cannot be recognized accurately, the phoneme in the audio and the corresponding phoneme into which the character in the lyrics is converted cannot be aligned.

Figure 5:
FIG. 5 is a schematic diagram 1 of text time annotation according to an embodiment of this application.

To resolve the foregoing problem, this application provides a text time annotation method. Two adjacent text units in audio are distinguished based on a fundamental frequency of the audio, and then the distinguished text units are aligned with a text unit in a text based on playing start-end time periods of the distinguished text units, to obtain text time annotation. In this embodiment of this application, a focus is how to recognize an interval between two text units, instead of how to recognize a text unit in the conventional technology. Therefore, a problem that the text cannot be aligned because a user sings wrongly may be ignored, to improve annotation accuracy. For example, FIG. 5 is a schematic diagram 1 of text time annotation according to an embodiment of this application. As shown in FIG. 5, in this embodiment of this application, an interval between two adjacent characters such as "-" and "刻" or "刻" and "也" in audio "一刻也不能分割" is obtained based on the fundamental frequency of the audio, each character in the audio "一刻也不能分割" and a character in a lyric "一刻也不能分割" may be indirectly aligned one by one, and a playing start-end time period of each character in the lyric may be accurately annotated. It should be understood that the text time annotation method provided in this embodiment of this application is not only applicable to time annotation of the lyric, but also applicable to time annotation of a corresponding text such as a poem, a human voice, or an electronic human voice. The electronic human voice may be a synthetic human voice, for example, audio output in a process in which a voice assistant and the user interact.

Figure 6:
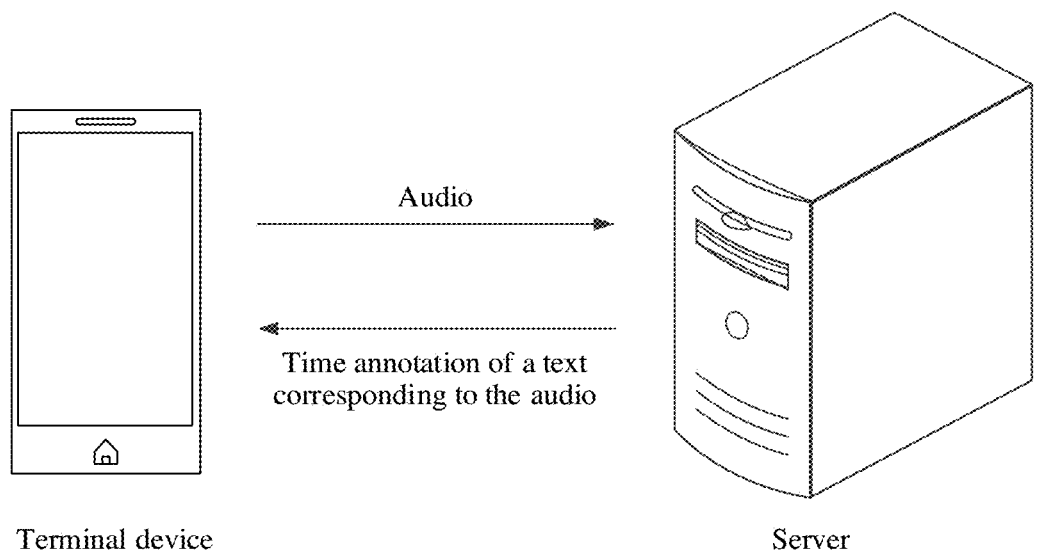
FIG. 6 is a schematic diagram of a scenario to which a text time annotation method is applicable according to an embodiment of this application.

FIG. 6 is a schematic diagram of a scenario to which a text time annotation method is applicable according to an embodiment of this application. As shown in FIG. 6, the scenario may include a terminal device and a server. The terminal device may send audio to the server, and the server may perform, based on the audio, time annotation on a text corresponding to the audio. The terminal device in this embodiment of this application may be referred to as a terminal Terminal, user equipment (user equipment, UE), a mobile station (mobile station, MS), a mobile terminal (mobile terminal, MT), or the like. The terminal device may be a mobile phone (mobile phone), a tablet computer (pad), a computer having a wireless transceiver function, a personal digital assistant (personal digital assistant, PDA), a handheld device having a wireless communication function, a computer or another processing device, a wearable device (a watch, a sports hand ring, a sports foot ring, or the like), a virtual reality (virtual reality, VR) terminal device, an augmented reality (augmented reality, AR) terminal device, a wireless terminal in smart home (smart home), a terminal device in a 5G network, a terminal device in a future evolved public land mobile network (public land mobile network, PLMN), or the like. This is not limited in this embodiment of this application.

Figure 7:
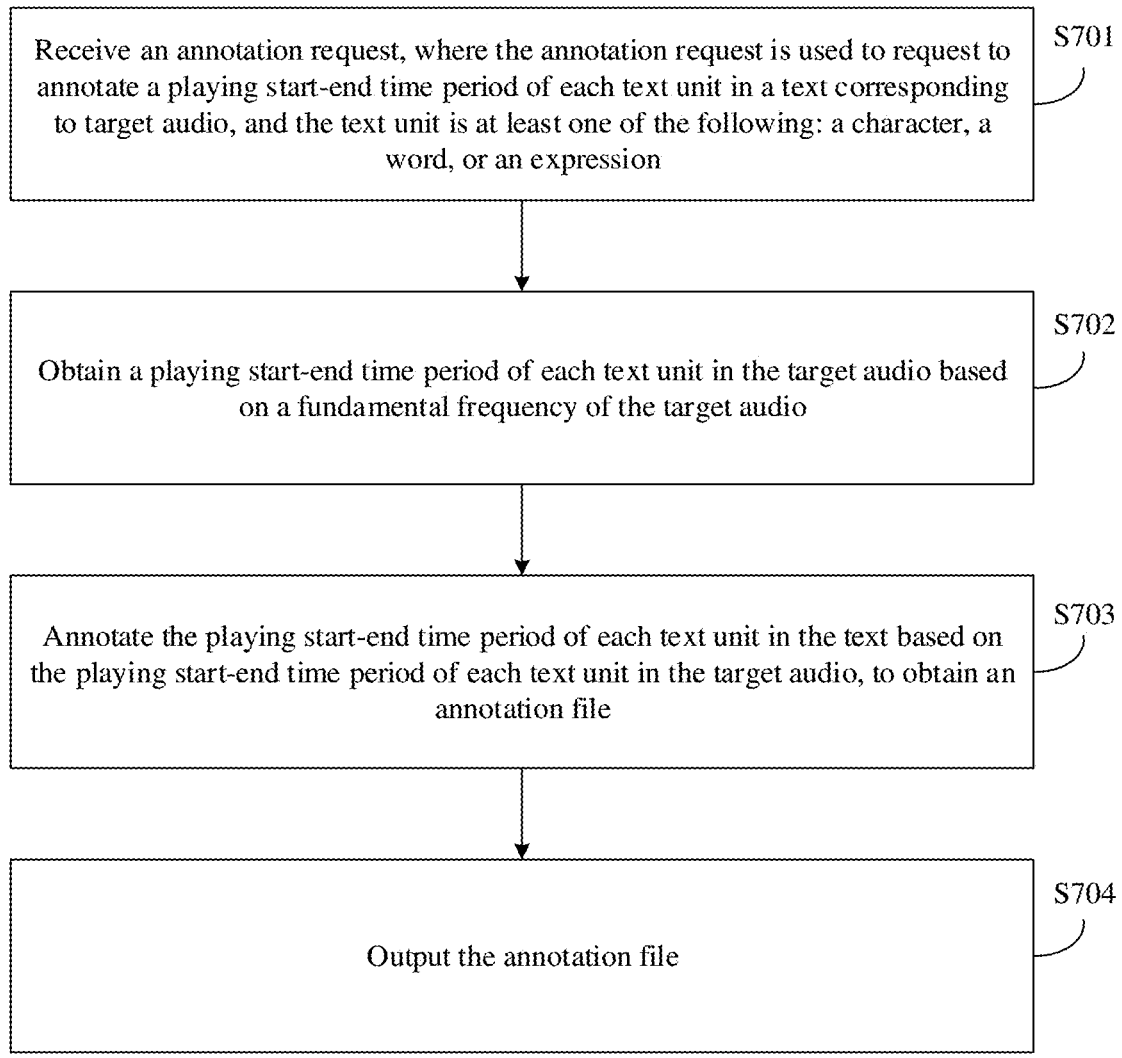
FIG. 7 is a schematic flowchart of an embodiment of a text time annotation method according to an embodiment of this application.

The following describes in detail the text time annotation method in embodiments of this application with reference to specific embodiments. It should be understood that, in embodiments of this application, the text time annotation method may be performed by a server or a terminal device. In the following embodiments, an electronic device (a server or a terminal device) is used as an example for description. The following several specific embodiments may be combined with each other, and a same or similar concept or process may not be described repeatedly in some embodiments. FIG. 7 is a schematic flowchart of an embodiment of a text time annotation method according to an embodiment of this application. As shown in FIG. 7, the text time annotation method provided in this embodiment of this application may include the following steps.

S701: Receive an annotation request, where the annotation request is used to request to annotate a playing start-end time period of each text unit in a text corresponding to target audio, and the text unit is at least one of the following: a character, a word, or an expression.

S702: Obtain a playing start-end time period of each text unit in the target audio based on a fundamental frequency of the target audio.

S703: Annotate the playing start-end time period of each text unit in the text based on the playing start-end time period of each text unit in the target audio, to obtain an annotation file.

S704: Output the annotation file.

In S701, it should be understood that when the electronic device is a server, the server may receive an annotation request from a terminal device or an annotation request entered by a user. When the electronic device is a terminal device, the terminal device may receive an annotation request entered by a user or an annotation request from another terminal device. For example, an annotation control may be disposed on the terminal device, and the user selects the annotation control (for example, selects the annotation control through tapping, sliding, or pressing), to trigger entering of the annotation request into the terminal device. The terminal device may receive the annotation request, or the terminal device may send the annotation request to the server (or another terminal device), so that the server (or the another terminal device) receives the annotation request from the terminal device.

The annotation request is used to request to annotate a playing start-end time period of each text unit in the text corresponding to the target audio. The target audio may be network audio or local audio in the terminal device. When the target audio is network audio, the annotation request may include an identifier of the target audio, for example, a song name of a song, and the electronic device may download the target audio based on the identifier of the target audio. Alternatively, the target audio may be audio recorded by the terminal device. It should be understood that, because an interval between text units in the audio needs to be recognized in this embodiment of this application, to improve text time annotation accuracy, the target audio may include only audio of a human voice, and the human voice may also be referred to as a cappella, and is a pure human voice without music. It should be understood that the audio of the human voice in this embodiment of this application may be a voice made by a real person, or may be a synthetic human voice, and the synthetic human voice is, for example, a human voice played by a voice assistant. Alternatively, the audio of the human voice may further include audio of a non-human voice that may be converted into a text, for example, "meow" from a kitten and "wow" from a dog. It should be understood that, if the network audio or the local audio is the audio that includes the non-human voice, the electronic device may further separate the audio of the non-human voice from the audio of the human voice, to obtain target audio that includes only the audio of the human voice.

For example, when the target audio is a song, the text corresponding to the target audio is a lyric of the song; when the target audio is a poem, the text corresponding to the target audio is a lyric of the poem; and when the target audio is host audio, the text corresponding to the target audio is a host script. The text unit may be at least one of the following: a character, a word, or an expression. For example, when the text is a Chinese text, the text unit may be a character, for example, "刻", or an expression "一刻". When the text is a non-Chinese text, the text unit may be a word, for example, "Sunday". In this embodiment of this application, whether the text unit includes a character, a word, or an expression may be preset. It should be understood that, when the text unit has a smaller composition, for example, a character that is less than an expression, a finer text annotation granularity indicates a higher finer degree. In the following embodiment, an example in which the text unit is a character is used for description.

Figure 8:
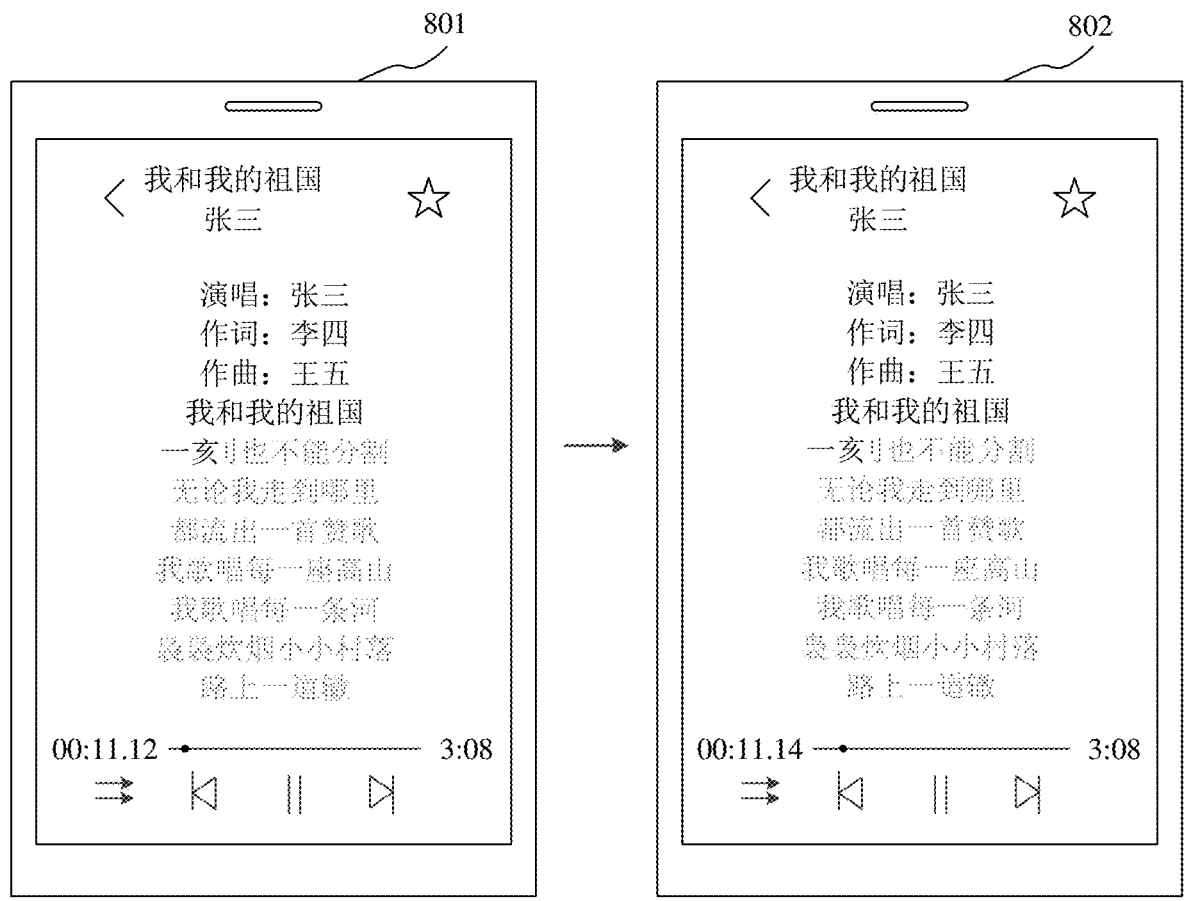
FIG. 8 is a schematic diagram 1 of an interface change of a terminal device according to an embodiment of this application.

The playing start-end time period of the text unit includes a playing start time point and a playing end time point. For example, a playing start time point and a playing end time point of "刻" are respectively [00:11.12] and [00:11.14], "oo" in 00:11.12 represents time of playing in a unit of minute, "11" represents time in a unit of second, and "12" represents time in a unit of millisecond. In other words, when [00:11.12] in the audio is played, the terminal device may start to render "刻" in a lyric, and rendering of "刻" is completed at [00:11.12]. FIG. 8 is a schematic diagram 1 of an interface change of a terminal device according to an embodiment of this application. As shown in an interface 801 in FIG. 8, an audio playing time point is [00:11.12], and "刻" starts to be rendered. In FIG. 8, that a character "刻" is rendered from gray to black is used as an example. In this case, a left side of the character "刻" is rendered. When the audio playing time point is [00:11.14], an interface may be shown as 802. In this case, the character "刻" is completely rendered in black. In this embodiment of this application, a manner of rendering the terminal device is not limited. A manner in FIG. 8 is an example.

In S702, a fundamental tone is a pure tone with a lowest frequency in each musical tone, and has highest strength. A frequency of the fundamental tone is the fundamental frequency, and determines a pitch of the whole tone. The fundamental frequency of the target audio may include a fundamental frequency of each musical tone in the target audio. For example, fundamental tones of "一", "刻", "也", "不", "能", "分" and "割" may be respectively considered as "do", "mi", "si", "la", "mi", and "so", and then a fundamental frequency of each text unit in the target audio may be obtained. It should be understood that audio of fundamental tones is different even if the fundamental tones are the same. For example, fundamental tones of "刻" and "分" are both "mi", but frequencies (namely, fundamental frequencies) of the fundamental tones of "刻" and "分" may be different. Therefore, the fundamental frequencies may be used to distinguish an interval between two adjacent text units in the target audio.

Figure 9:
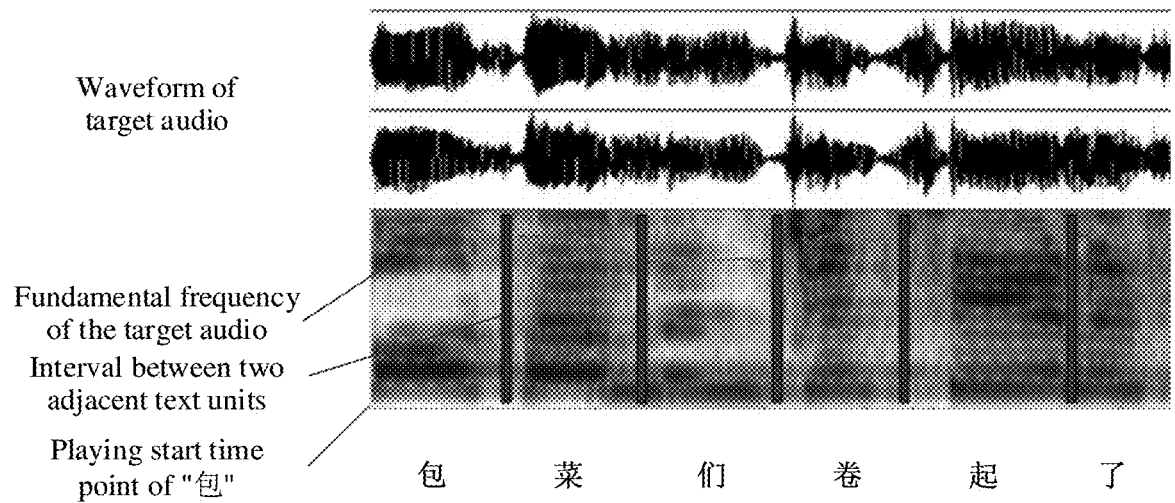
FIG. 9 is a schematic diagram of a fundamental frequency according to an embodiment of this application.

In this embodiment of this application, the playing start-end time period of each text unit in the target audio may be obtained based on the fundamental frequency of the target audio. Specifically, a moment between the two adjacent text units in the target audio may be obtained based on a change rate of the fundamental frequency of the target audio, and the playing start-end time period of each text unit in the target audio is further obtained. Optionally, in this embodiment of this application, a moment at which the change rate of the fundamental frequency is greater than a change rate threshold may be obtained, the moment is used as a moment at which the two adjacent text units in the target audio are segmented, the moment is used as a playing end time point of a current text unit in the target audio, and the moment is used as a playing start time point of a next text unit in the target audio. FIG. 9 is a schematic diagram of a fundamental frequency according to an embodiment of this application. As shown in FIG. 9, a fundamental frequency corresponding to a waveform of the target audio is represented by using a gray line in FIG. 9. In this embodiment of this application, the moment at which the change rate of the fundamental frequency is greater than the change rate threshold may be annotated, as shown by a black vertical line in the figure. For example, if the text corresponding to the target audio is "包菜们卷起了", five black vertical lines in FIG. 9 are used to segment six text units in the text. To be specific, a first black vertical line is used to segment "包" and "菜", and a moment corresponding to the first black vertical line is a playing end time point of "包" and a playing start time point of "菜". By analogy, a playing start-end time period of each text unit in "包菜们卷起了" can be obtained. It should be understood that a playing start time point of "包" may be a playing end time point of a previous text unit of "包". If there is no text unit before "包", a playing start time point of the target audio may be used as the playing start time point of "包", as shown in FIG. 9.

Figure 10:
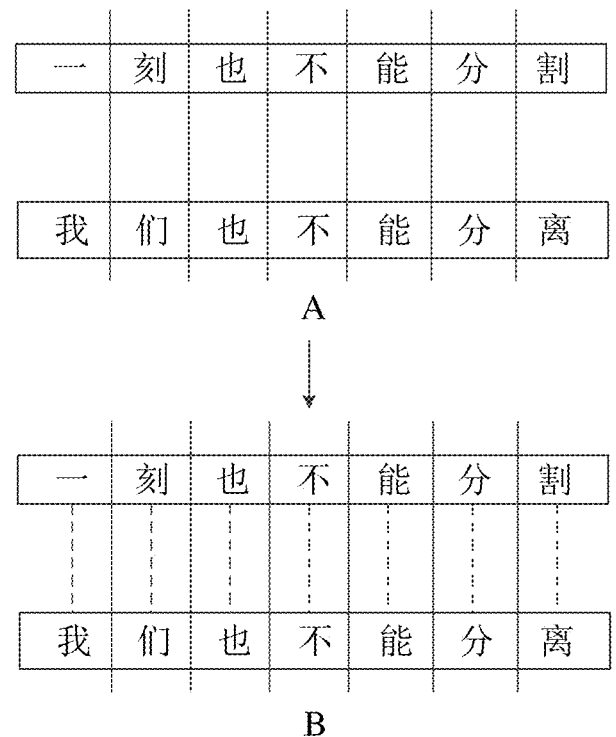
FIG. 10 is a schematic diagram 2 of text time annotation according to an embodiment of this application.

In S703, in this embodiment of this application, after the playing start-end time period of each text unit in the target audio is obtained in the manner in S702, the playing start-end time period of each text unit in the text may be annotated, to obtain the annotation file. For example, FIG. 10 is a schematic diagram 2 of text time annotation according to an embodiment of this application. For A in FIG. 10, refer to related descriptions in FIG. 5. In this embodiment of this application, the moment between the two adjacent text units may be obtained from the target audio, the target audio may be aligned character by character with the text corresponding to the target audio, and a one-to-one mapping relationship is formed between the playing start-end time period of each text unit in the target audio and each text unit, as shown in B in FIG. 10.

It should be understood that, the annotation file may be obtained by adding the playing start-end time period corresponding to each text unit to the text corresponding to the target audio, or the annotation file may be a mapping relationship between each text unit in the text corresponding to the target audio and the playing start-end time period corresponding to each text unit. In this embodiment of this application, a format of the annotation file is not limited, provided that an annotation text can represent the playing start-end time period of each text unit in the text corresponding to the target audio.

In S704, in this embodiment of this application, the electronic device may output the annotation file after obtaining the annotation file. For example, when the electronic device is a server, the server may send the annotation file to the terminal device. When the electronic device is a terminal device, the terminal device may render, based on the annotation file, the text corresponding to the target audio, as shown in FIG. 8.

The text time annotation method provided in this embodiment of this application includes: receiving the annotation request; obtaining the playing start-end time period of each text unit in the target audio based on the fundamental frequency of the target audio; annotating the playing start-end time period of each text unit in the text based on the playing start-end time period of each text unit in the target audio, to obtain the annotation file; and outputting the annotation file. The annotation request is used to request to annotate the playing start-end time period of each text unit in the text corresponding to target audio, and the text unit is at least one of the following: a character, a word, or an expression. In this embodiment of this application, the moment between the two adjacent text units in the text corresponding to the target audio may be recognized based on the fundamental frequency of the target audio, to distinguish between the two adjacent text units, and further align the text units. The text units are not aligned in a current text unit recognition manner, to avoid a problem that text time annotation cannot be performed when a text unit in the target audio is inconsistent with a text unit in the text corresponding to the target audio. Text time annotation accuracy may be improved in this embodiment of this application.

Figure 11:
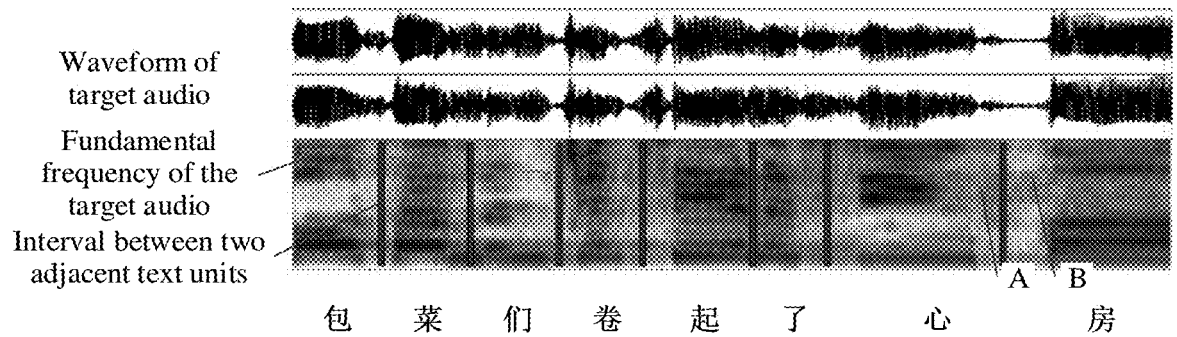
FIG. 11 is a schematic diagram of a fundamental frequency and short-time energy according to an embodiment of this application.
Figure 12:
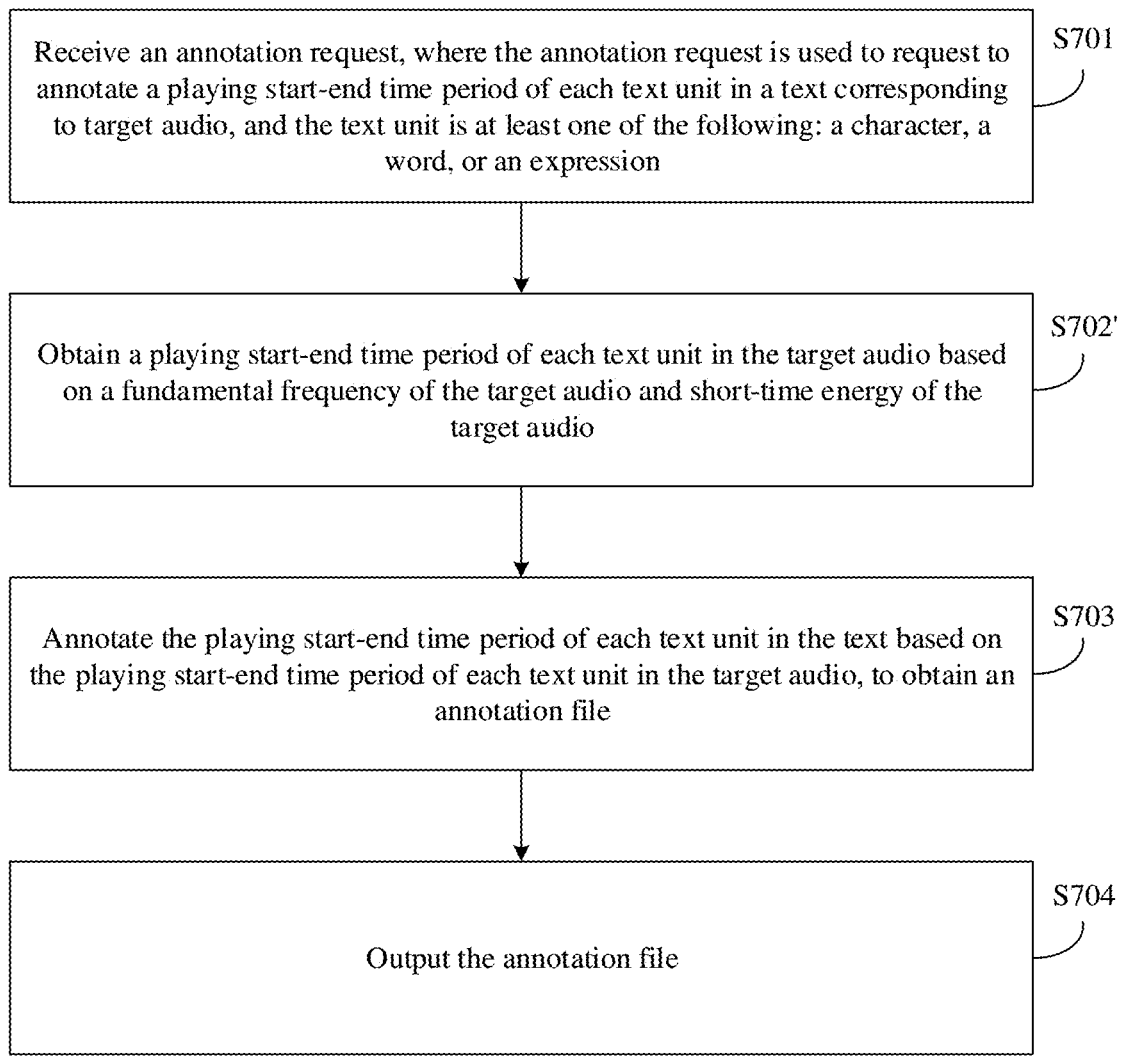
FIG. 12 is a schematic flowchart of another embodiment of a text time annotation method according to an embodiment of this application.

In this embodiment, a method for obtaining the playing start-end time period of each text unit in the target audio based on the fundamental frequency of the target audio is described. FIG. 11 is a schematic diagram of a fundamental frequency and short-time energy according to an embodiment of this application. As shown in FIG. 11, the text corresponding to the target audio is "包菜们卷起了心房". In the manner of determining the moment between the two adjacent text units based on the fundamental frequency, there are two moments at which the change rate of the fundamental frequency is greater than the change rate threshold between "心" and "房", as shown in A and B in FIG. 11. However, there needs to be only one interval between ""心" and "房". Therefore, accuracy may be low if the playing start-end time period of each text unit in the target audio is obtained based on only the fundamental frequency. Therefore, to improve accuracy of obtaining the playing start-end time period of each text unit, the playing start-end time period of each text unit may alternatively be obtained based on the fundamental frequency of the target audio and short-time energy of the target audio. FIG. 12 is a schematic flowchart of another embodiment of a text time annotation method according to an embodiment of this application. As shown in FIG. 12, S702 in the foregoing embodiment may be replaced with S702'. S702': Obtain the playing start-end time period of each text unit in the target audio based on the fundamental frequency of the target audio and the short-time energy of the target audio.

In S702', in this embodiment of this application, a first moment at which the change rate of the fundamental frequency of the target audio is greater than the change rate threshold may be obtained based on the fundamental frequency of the target audio. If a quantity of first moments is equal to "a quantity of text units in the text corresponding to the target audio" minus 1, it may be determined that the first moment is a moment between text units in the text corresponding to the target audio. As shown in FIG. 9, if the target audio "包菜们卷起了" includes five first moments, the five first moments are moments between text units in the text corresponding to the target audio.

It should be noted that in this embodiment of this application, if the quantity of first moments is greater than or equal to the quantity of text units in the text corresponding to the target audio, it may be determined that there are at least two first moments between two text units (for example, a first text unit and a second text unit) in the text. In this case, in this embodiment of this application, a playing end time point of the first text unit and a playing start time point of the second text unit may be determined in the at least two first moments based on the short-time energy of the target audio.

In this embodiment of this application, a second moment may be obtained from the first moment based on the short-time energy. An average value of short-time energy between two adjacent second moments is less than a first short-time energy threshold. In other words, in this embodiment of this application, an average value of short-time energy between two adjacent first moments may be obtained. If the average value is less than the first short-time energy threshold, the two adjacent first moments each are used as a second moment. For example, if there are eight first moments in FIG. 11, there are two first moments between "心" and "房", and an average value of short-time energy between the two first moments is less than the first short-time energy threshold, the two first moments may be used as second moments.

In this embodiment of this application, the playing start-end time period of each text unit in the target audio may be obtained based on the first moment and the second moment, to obtain the playing start-end time period of each text unit in the target audio. A possible implementation is as follows: An average value of consecutively existing second moments may be used as a playing end time point of a current text unit and a playing start time point of a next text unit. For example, an average value of the two second moments in FIG. 11 may be used as a playing end time point of "心" and a playing start time point of "房".

It should be understood that a song may include a plurality of lyrics and a large intermezzo may exist between lyrics. The intermezzo may be a pure musical intermezzo without a human voice. However, if the entire target audio is used as a whole and a playing end time point of a last character of a lyric is used as a playing start time point of a first character of a next lyric, a rendering time point of the first character of the next lyric may be too early. For example, a next lyric of "包菜们卷起了心房" is "白雾里有鲜橙汁在流淌". If there is an enlarged musical intermezzo between the two lyrics and a playing end time point of "房" is used as a playing start time point of "白", "白" has started to be rendered before the character "白" in the target audio is played. Because the target audio may include at least one sub-audio segment, in this embodiment of this application, one sub-audio segment may be used as a whole to obtain a time period of each text unit in a text corresponding to the sub-audio segment, to obtain the playing start-end time period of each text unit in the target audio. For example, the sub-audio segment may be an audio segment corresponding to a lyric.

Figure 13:
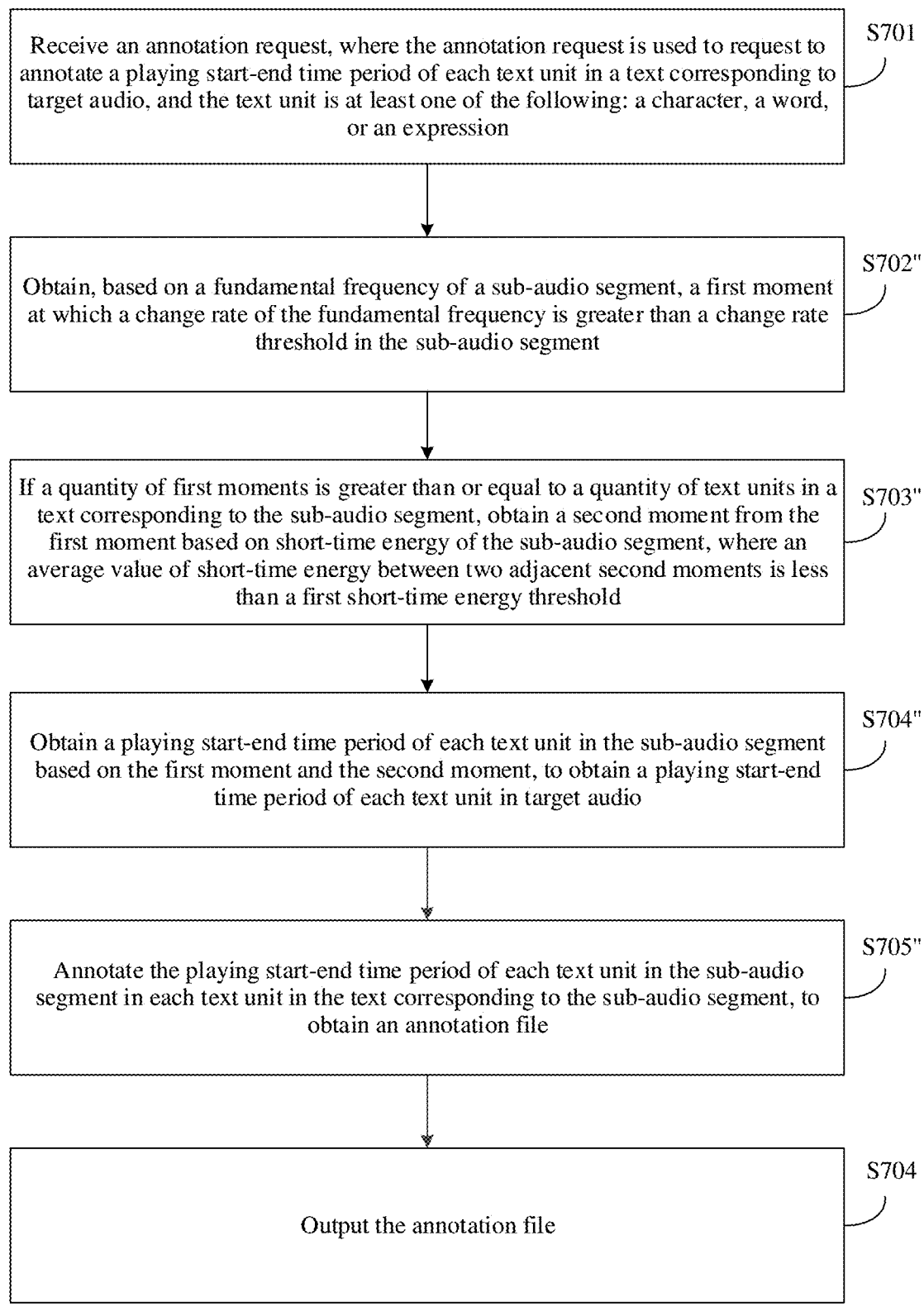
FIG. 13 is a schematic flowchart of another embodiment of a text time annotation method according to an embodiment of this application.

FIG. 13 is a schematic flowchart of another embodiment of a text time annotation method according to an embodiment of this application. As shown in FIG. 13, S702 in the foregoing embodiment may be replaced with S702" to S704", and correspondingly, S703 in the foregoing embodiment may be replaced with S705".

S702": Obtain, based on a fundamental frequency of a sub-audio segment, a first moment at which a change rate of the fundamental frequency is greater than a change rate threshold in the sub-audio segment.

S703": If a quantity of first moments is greater than or equal to a quantity of text units in a text corresponding to the sub-audio segment, obtain a second moment from the first moment based on short-time energy of the sub-audio segment, where an average value of short-time energy between two adjacent second moments is less than a first short-time energy threshold.

S704": Obtain a playing start-end time period of each text unit in the sub-audio segment based on the first moment and the second moment, to obtain a playing start-end time period of each text unit in target audio.

S705": Annotate the playing start-end time period of each text unit in the sub-audio segment in each text unit in the text corresponding to the sub-audio segment, to obtain an annotation file.

It should be understood that, in this embodiment of this application, the target audio may be segmented into a plurality of sub-audio segments. A manner of segmentation into the sub-audio segment may be as follows: If no audio of a human voice exists within a preset time length after audio of the human voice ends, the audio of the human voice may be used as a sub-audio segment.

To more accurately obtain a start time point and an end time point of at least one sub-audio segment in the target audio, in other words, to more accurately obtain a start time point of a 1$^{st}$ text unit and an end time point of a last text unit in the text corresponding to the sub-audio segment, in this application, the target audio may be further segmented into at least one sub-audio segment based on short-time energy of the target audio. In this embodiment of this application, at least one first time length in which short-time energy is less than a second short-time energy threshold in the target audio may be obtained, and the target audio is segmented based on a playing moment corresponding to a second time length that is greater than a preset time length in the first time length, to obtain at least one sub-audio segment.

For example, if a first time length in which short-time energy of audio is less than the second short-time energy threshold after "包菜们卷起了心房" in the target audio is played is 3 s, and the preset time length is 2 s, the target audio may be segmented based on a playing moment corresponding to the first time length in the target audio. If a moment corresponding to the first time length is from [3:00.12] to [6:00.12], in this embodiment of this application, [3:00.12] may be used as a playing end time point of a current sub-audio segment, and [6:00.12] is used as a playing start time point of a next sub-audio segment. In the method, the target audio may be segmented into the at least one sub-audio segment, and a playing start-end time period of each sub-audio segment can be accurately obtained, to avoid a problem that a rendering time point of a last text unit in a text corresponding to each sub-audio segment is too late and the rendering time point of the last text unit is too early, so that the playing start-end time period of each text unit in the text is more accurate.

For implementations in S702" and S703", refer to related descriptions in S702'. In other words, the target audio in S702' may be replaced with the sub-audio segment.

In S704", in the foregoing embodiment, an average value of at least two second moments is used as the playing end time point of the current text unit and the playing start time point of the next text unit. Actually, accuracy is still low. Because the two second moments may be moments corresponding to audio of a non-human voice, the playing end time point of the previous text unit and the playing start time point of the next text unit are delayed.

In this embodiment of this application, to more accurately obtain the playing start-end time period of each text unit, when the playing start-end time period of each text unit in the sub-audio segment is obtained based on the first moment and the second moment, at least one second moment group of the sub-audio segment is obtained in an early-to-late order of a third moment and the second moment. The second moment group includes at least two consecutive second moments, and a moment adjacent to the second moment group is a third moment. The third moment is a moment other than the second moment in the first moment. For example, two consecutive second moments between "心" and "房" in FIG. 11 may be used as one second moment group, and another first moment is a third moment. If there are three second moments between "包" and "菜", in this embodiment of this application, the three second moments may be used as one second moment group. It should be understood that, in this embodiment of this application, second moments in each second moment group are consecutive second moments in the first moment.

In this embodiment of this application, each third moment and each second moment group each may be used as one moment unit, to obtain a plurality of moment units, and the playing start-end time period of each text unit in the sub-audio segment is further obtained in an early-to-late order of moment units. For example, as shown in FIG. 11, in this embodiment of this application, six third moments and one second moment group each are used as one moment unit, to obtain seven moment units. In the early-to-late order of moment units, if a moment in an $i^{th}$ moment unit is a third moment, the third moment in the $i^{th}$ moment unit is used as a playing end time point of an $i^{th}$ text unit and a playing start time point of an $(i+1)^{th}$ text unit in the sub-audio segment;

and if the moment in the $i^{th}$ moment unit is a second moment group, an earliest second moment in the second moment group in the $i^{th}$ moment unit is used as the playing end time point of the $i^{th}$ text unit in the sub-audio segment, and a latest second moment in the second moment group in the $i^{th}$ moment unit is used as the playing start time point of the $(i+1)^{th}$ text unit in the sub-audio segment. Herein, i is an integer greater than or equal to 1.

For example, a $1^{st}$ moment unit (a $1^{st}$ third moment) is used as the playing end time point of "包" and the playing start time point of "菜", a $2^{nd}$ moment unit (a $2^{nd}$ third moment) is used as a playing end time point of "菜" and a playing start time point of "们", . . . , and by analogy, a $6^{th}$ moment unit ($6^{th}$ third moment) is used as a playing end time point of "了" and a playing start time point of "心"; an earliest second moment in a $7^{th}$ moment unit ($1^{st}$ second moment group) is used as a playing end time point of "心", and a latest second moment in the $7^{th}$ moment unit ($1^{st}$ second moment group) is used as a playing start time point of "房". It should be understood that the playing start time point of "包" and a playing end time point of "房" may be obtained by determining a playing start-end time period of the sub-audio segment "包菜们卷起 了心房". A playing start time point of the sub-audio segment "包菜们卷起了心房" is the playing start time point of "包", and a playing end time point of the sub-audio segment "包菜们卷起了心 房" is the playing end time point of "房".

In S705", the target audio in this embodiment of this application includes at least one sub-audio segment, and a text corresponding to the target audio includes a text corresponding to the at least one sub-audio segment. In this embodiment of this application, when the text corresponding to the target audio is annotated, each text unit in the sub-audio segment is aligned with each text unit in the text corresponding to the sub-audio segment. Further, each text unit in the text corresponding to the sub-audio segment may be annotated by using the playing start-end time period of each text unit in the sub-audio segment, to obtain the annotation file.

In this embodiment of this application, a playing start-end time period of each text unit in the text corresponding to the target audio may be obtained based on a fundamental frequency and short-time energy of the target audio, to resolve a problem that an interval between two text units cannot be accurately determined due to the fundamental frequency. In addition, in this embodiment of this application, the target audio may be further segmented into sub-audio segments, and a playing start time point of a $1^{st}$ text unit and a playing end time point of a last text unit in each sub-audio segment can be more accurately determined, to avoid a problem that user experience is poor when a text unit is rendered too early or too late.

Figure 14:
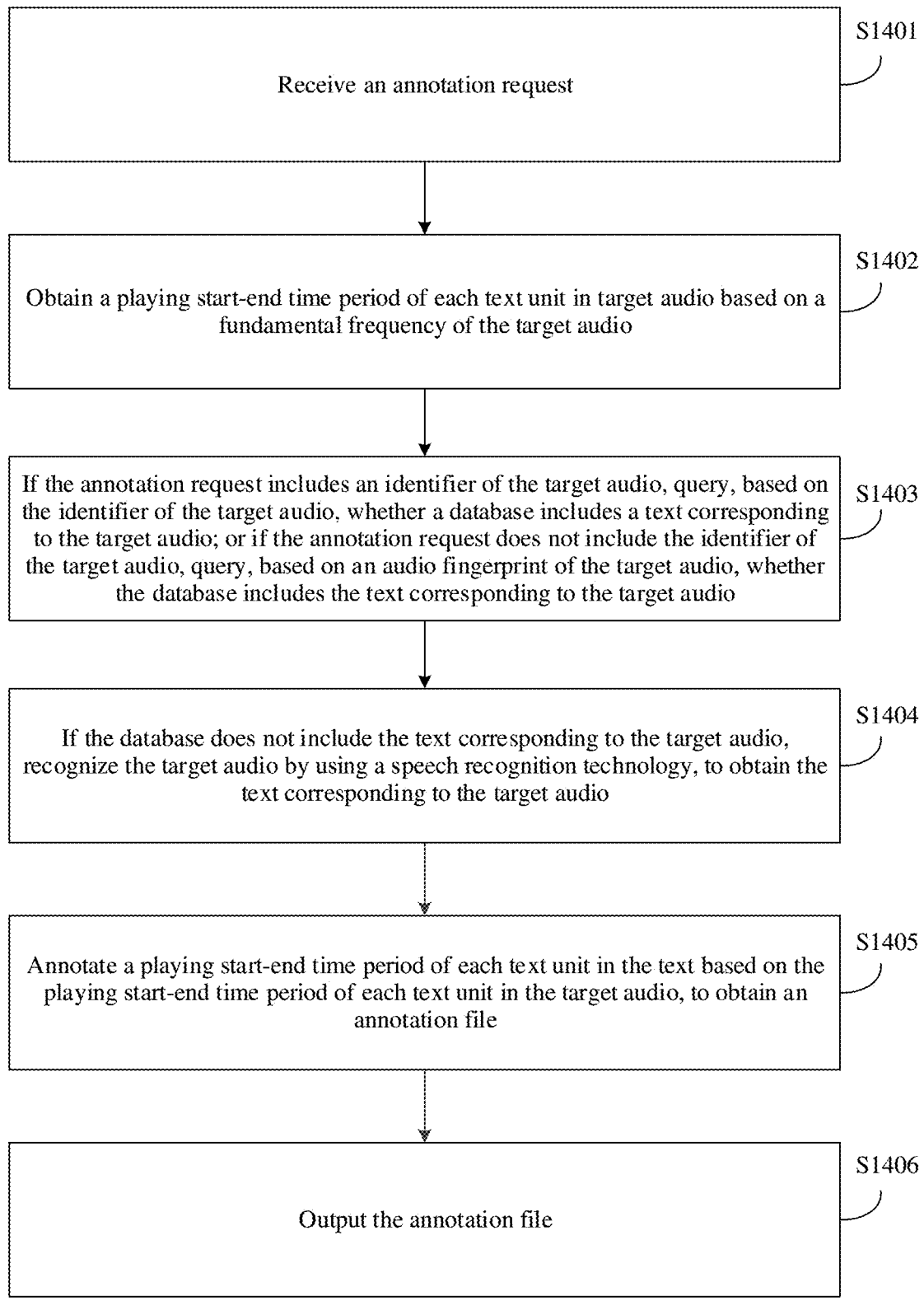
FIG. 14 is a schematic flowchart of another embodiment of a text time annotation method according to an embodiment of this application.

Currently, a lyric of an online song is manually pre-edited, stored, and uploaded, and a lyric database usually includes the lyric of the song. For other audio of an original song, a poem, or a human voice, the database usually does not include a text corresponding to the audio. If the lyric is manually edited and uploaded, efficiency is low, and an error easily occurs. Therefore, based on the foregoing embodiment, in a text time annotation method provided in an embodiment of this application, a text corresponding to target audio may be further recognized based on the target audio, to improve efficiency and accuracy. FIG. 14 is a schematic flowchart of another embodiment of a text time annotation method according to an embodiment of this application. As shown in FIG. 14, the text time annotation method provided in this embodiment of this application may include the following steps.

S1401: Receive an annotation request.

S1402: Obtain a playing start-end time period of each text unit in the target audio based on a fundamental frequency of the target audio.

S1403: If the annotation request includes an identifier of the target audio, query, based on the identifier of the target audio, whether the database includes the text corresponding to the target audio; or if the annotation request does not include the identifier of the target audio, query, based on an audio fingerprint of the target audio, whether the database includes the text corresponding to the target audio.

S1404: If the database does not include the text corresponding to the target audio, recognize the target audio by using a speech recognition technology, to obtain the text corresponding to the target audio.

S1405: Annotate a playing start-end time period of each text unit in the text based on the playing start-end time period of each text unit in the target audio, to obtain an annotation file.

S1406: Output the annotation file.

It should be understood that for implementations of S1401, S1402, S1405, and S1406 in this embodiment of this application, refer to related descriptions of S701, S702, S703, and S704 in the foregoing embodiments. In this embodiment of this application, S1402 and "S1403 and S1404" may be performed simultaneously, and a sequence of S1402 and "S1403 and S1404" is not limited.

In S1403, the annotation request may include the identifier of the target audio. For example, when the target audio is a song, the identifier of the target audio may be a song name of the song. A user may enter the identifier of the target audio in an interface of a terminal device, and further add the identifier of the target audio to the annotation request. If the annotation request includes the identifier of the target audio, an electronic device may query, based on the identifier of the target audio, whether the database includes the text corresponding to the target audio. It should be understood that the database may vary with a scenario to which this embodiment of this application is applied. If the scenario to which this embodiment of this application is applied is time annotation of the lyric, the database may be a lyric database, the lyric database may store a large quantity of lyrics, and each lyric corresponds to a song name. If the scenario to which this embodiment of this application is applied is time annotation of a poem, the database may be a poem database, and each song corresponds to a poem name. Optionally, the database in this embodiment of this application may further be a database including another text such as the lyric and the poem.

When the user triggers the annotation request, if the user enters a song name into the electronic device, a lyric of the song, namely, the text corresponding to the target audio, may be queried based on the song name in this embodiment of this application. If the annotation request does not include the identifier of the target audio, the electronic device may query, based on the audio fingerprint of the target audio, whether the database includes the text corresponding to the target audio. For example, in this embodiment of this application, a specific song that is the target audio may be recognized based on the audio fingerprint of the target audio, and then the lyric of the song is obtained from the database.

It should be understood that, for a principle of recognizing the song based on the audio fingerprint, refer to related descriptions in the conventional technology.

In S1404, it should be understood that if the database includes the text corresponding to the target audio, the text corresponding to the target audio may be obtained. If the database does not include the text corresponding to the target audio, the target audio is recognized by using the speech recognition technology (automatic speech recognition, ASR) in this embodiment of this application, to obtain the text corresponding to the target audio.

For different versions of target audio, to-be-online target audio, target audio having no text, or the like, in this embodiment of this application, a manual text editing manner may be avoided, and the text corresponding to the target audio may be automatically recognized, o achieve high efficiency and high accuracy.

Figure 15:
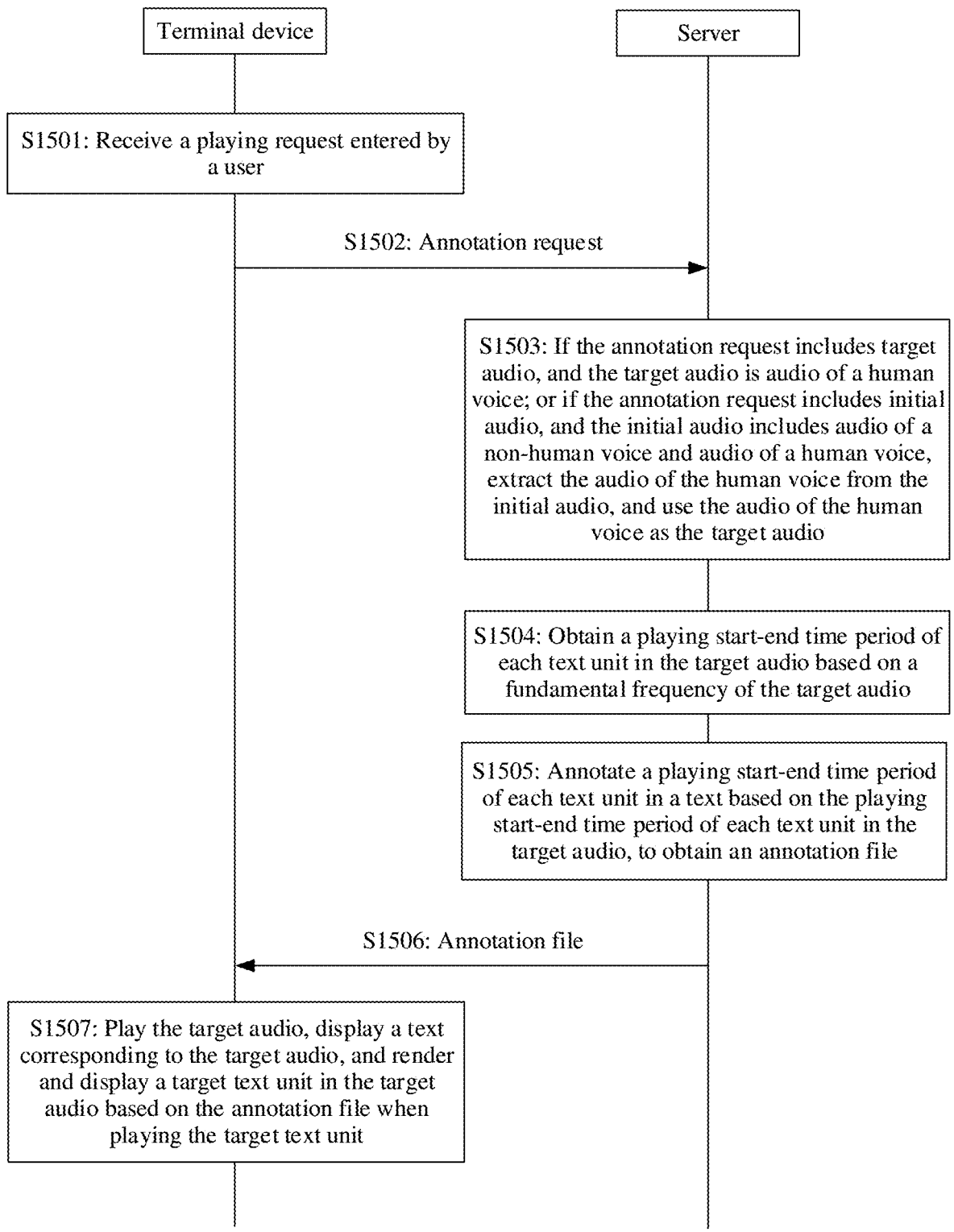
FIG. 15 is a schematic flowchart of another embodiment of a text time annotation method according to an embodiment of this application.

Based on the descriptions of the foregoing embodiments, the following describes a text time annotation process in an embodiment of this application for two application scenarios in which an electronic device is a server or a terminal device. FIG. 15 is a schematic flowchart of another embodiment of a text time annotation method according to an embodiment of this application. It should be understood that the electronic device in FIG. 15 is a server. As shown in FIG. 15, the text time annotation method provided in this embodiment of this application may include the following steps.

S1501: The terminal device receives a playing request entered by a user.

S1502: The terminal device sends an annotation request to the server.

Correspondingly, the server receives the annotation request from the terminal device.

S1503: If the annotation request includes target audio, and the target audio is audio of a human voice, perform S1504; or if the annotation request includes initial audio, and the initial audio includes audio of a non-human voice and audio of a human voice, extract the audio of the human voice from the initial audio, and use the audio of the human voice as target audio.

S1504: The server obtains a playing start-end time period of each text unit in the target audio based on a fundamental frequency of the target audio.

S1505: The server annotates a playing start-end time period of each text unit in a text based on the playing start-end time period of each text unit in the target audio, to obtain an annotation file.

S1506: The server sends the annotation file to the terminal device.

S1507: The terminal device plays the target audio, displays a text corresponding to the target audio, and renders and displays a target text unit in the target audio based on the annotation file when playing the target text unit.

It should be understood that, for implementations of S1504 and S1505 in this embodiment of this application, refer to related descriptions of S702 and S703 in the foregoing embodiments. This is not limited herein.

In S1501, the playing request is used to request to annotate the playing start-end time period of each text unit in the text corresponding to the target audio and play the target audio, and when the target audio is played, each text unit in the text is rendered and displayed based on the playing start-end time period of each text unit in the text corresponding to the target audio. In other words, after the playing request is used to request to annotate the playing start-end time period of each text unit in the text corresponding to the target audio, when playing the target audio, the terminal device renders, based on the playing start-end time period of each text unit in the text corresponding to the target audio, the text corresponding to the target audio. Then, an interface 801 shown in FIG. 8 is displayed.

Figure 16:
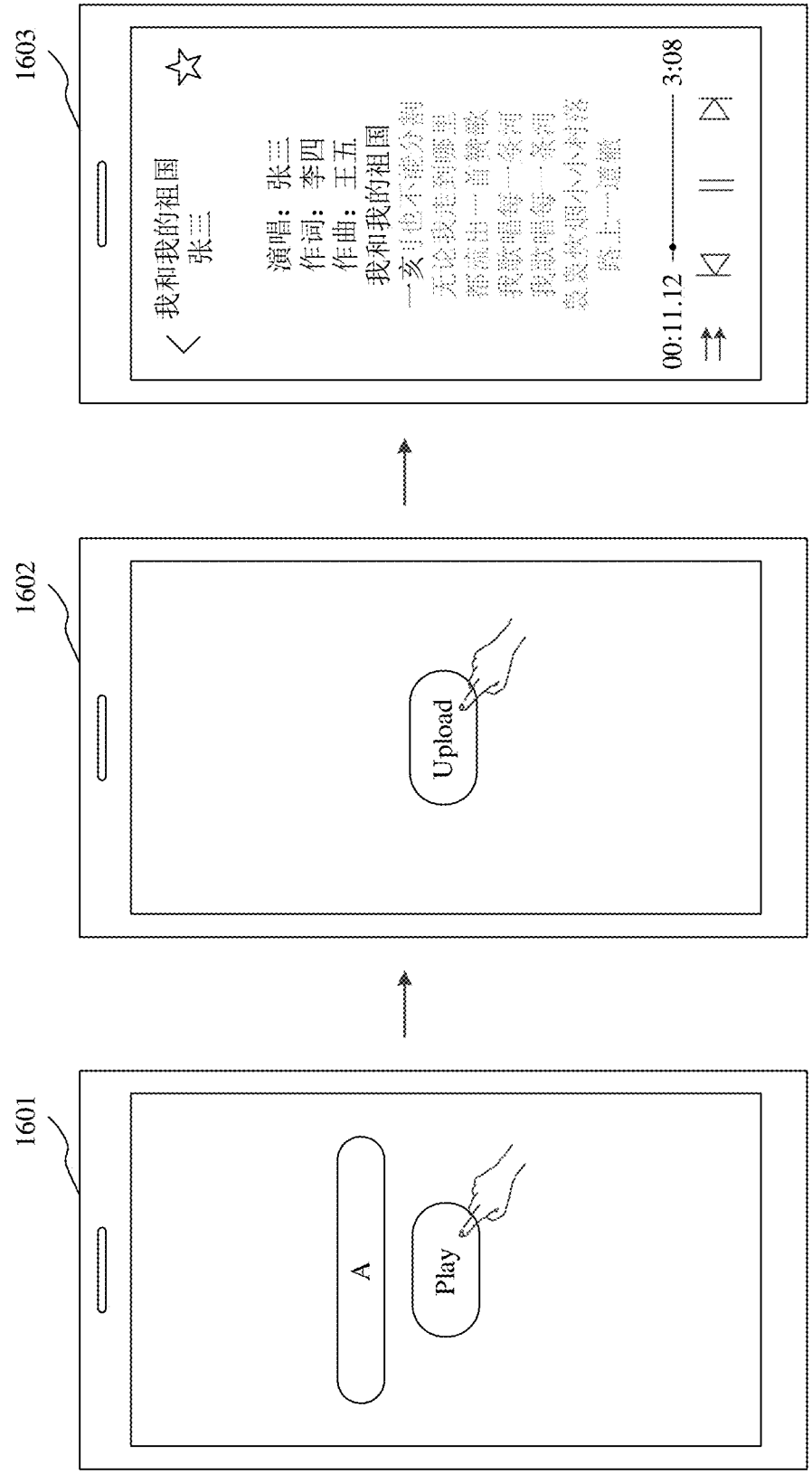
FIG. 16 is a schematic diagram 2 of an interface change of a terminal device according to an embodiment of this application.

For example, a "Play" control may be displayed in an interface of the terminal device. After triggering selection of the "Play" control, the user may trigger entering of the playing request into the terminal device. FIG. 16 is a schematic diagram 2 of an interface change of a terminal device according to an embodiment of this application. The "Play" control may be displayed in an interface 1601 in FIG. 16. After the user triggers the "Play" control, the interface 1601 may jump to an interface 1602. The interface 1602 may display a control for uploading audio. The user may select an "Upload" control, to upload audio. Alternatively, in this embodiment of this application, the user may select the "Play" control after selecting the audio. In this embodiment of this application, a manner of uploading the audio by the user and a manner of triggering entering of the playing request are not limited. Optionally, the interface 1601 may further display an input box with an identifier of input audio. If the audio uploaded by the user is an adapted song A, the user may enter a song name "A" of a song into the input box. Optionally, the user may not enter the identifier of the audio.

In S1503, it should be noted that the server may perform S1504 if the audio uploaded by the user is the target audio (audio that includes only audio of a human voice), in other words, audio carried in the playing request is the target audio. If the audio uploaded by the user is the initial audio, and the initial audio includes the audio of the non-human voice and the audio of the human voice (namely, audio of a non-pure human voice), the server may extract the audio of the human voice from the initial audio, and use the audio of the human voice as the target audio.

In this embodiment of this application, the server may prestore a human voice recognition model, and the initial audio may be entered into the human voice recognition model, to obtain the audio of the human voice obtained after the audio of the non-human voice is removed. The human voice recognition model is used to separate the audio of the human voice from the audio of the non-human voice in the initial audio. Optionally, the human voice recognition model in this embodiment of this application is a neural network model, and the server may pre-train the human voice recognition model by using audio of a pure human voice as a training parameter and by using, as a training parameter, training audio obtained by synthesizing accompaniment audio. Optionally, the neural network model in this embodiment of this application may be but is not limited to a U-Net network model.

In S1502 and S1506, after receiving the playing request, the terminal device may send an annotation request to the server, to trigger the server to perform the text time annotation method in the foregoing embodiments, to obtain the annotation file. After obtaining the annotation file, the server may send the annotation file to the terminal device.

In S1507, the terminal device may play the target audio, and when playing the target audio, display the text corresponding to the target audio. In this embodiment of this application, when displaying the text corresponding to the target audio, the terminal device may render and display the target text unit in the target audio based on the annotation file when playing the target text unit. In other words, the terminal device may start to render the target text unit at a playing start time point of playing the target text unit based on a time period of playing the target audio and a playing start-end time period corresponding to each text unit in the annotation file, and complete rendering of the target text unit at a playing end time point of playing the target text unit. For example, the interface 1602 may jump to an interface 1603, and the interface 1603 is the same as the interface 801 in FIG. 8. Reference may be made to the related descriptions. It should be noted that, in this embodiment of this application, to represent that the terminal device renders the text unit, an interface in which the target audio is played for a period of time in the interface 1603 is used as an example for description.

In this embodiment of this application, the terminal device may interact with the server, and the server performs time annotation on the text corresponding to the target audio, to obtain an accurate annotation file. For other technical effects in this embodiment of this application, refer to related descriptions in the foregoing embodiments.

Figure 17:
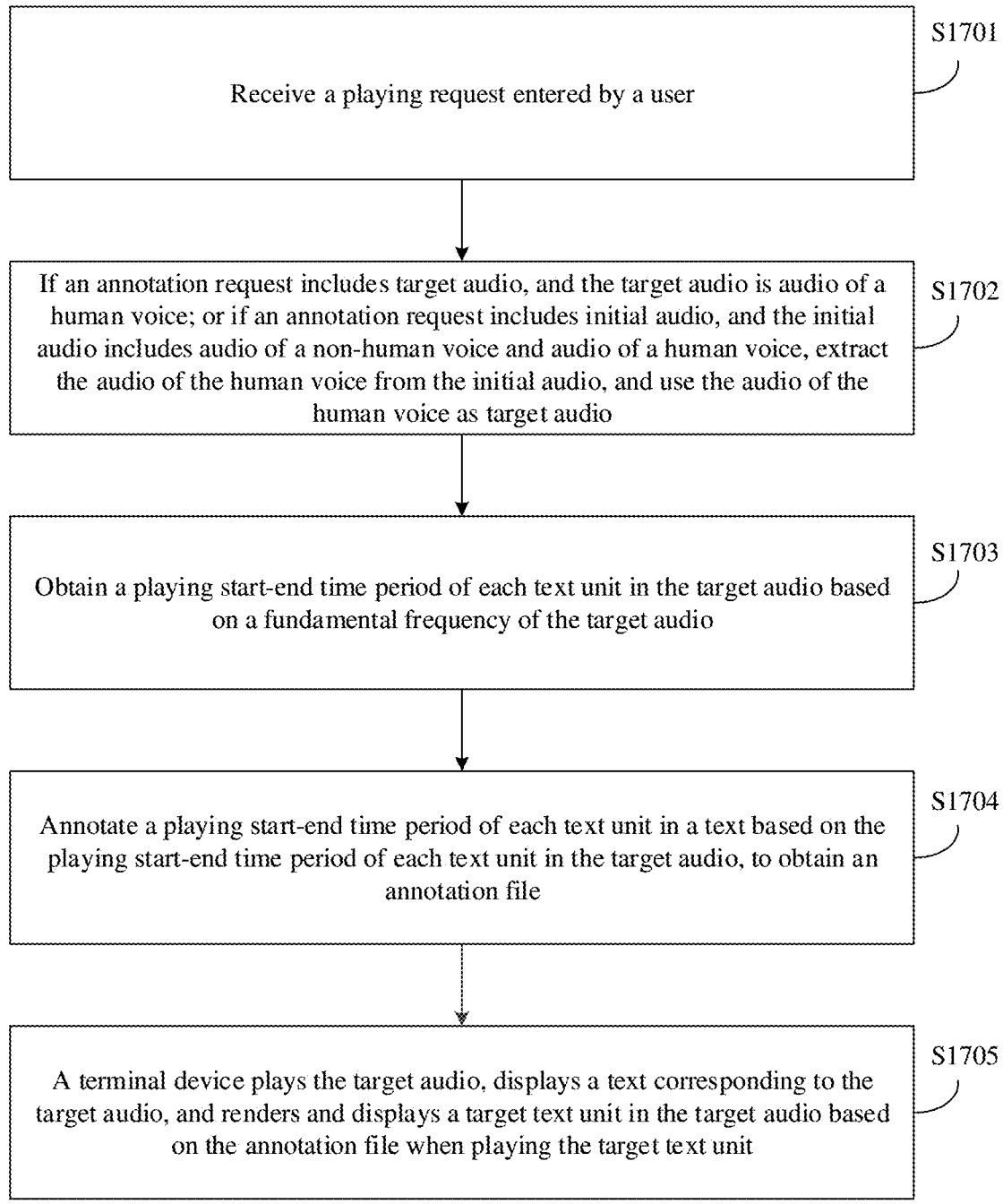
FIG. 17 is a schematic flowchart of another embodiment of a text time annotation method according to an embodiment of this application.

FIG. 17 is a schematic flowchart of another embodiment of a text time annotation method according to an embodiment of this application. It should be understood that the electronic device in FIG. 17 is a terminal device. As shown in FIG. 17, the text time annotation method provided in this embodiment of this application may include the following steps.

S1701: Receive a playing request entered by a user.

S1702: If an annotation request includes target audio, and the target audio is audio of a human voice, perform S1703; or if an annotation request includes initial audio, and the initial audio includes audio of a non-human voice and audio of a human voice, extract the audio of the human voice from the initial audio, and use the audio of the human voice as target audio.

S1703: Obtain a playing start-end time period of each text unit in the target audio based on a fundamental frequency of the target audio.

S1704: Annotate a playing start-end time period of each text unit in a text based on the playing start-end time period of each text unit in the target audio, to obtain an annotation file.

S1705: The terminal device plays the target audio, displays a text corresponding to the target audio, and renders and displays a target text unit in the target audio based on the annotation file when playing the target text unit.

It should be understood that for S1701 to S1705 in this embodiment of this application, refer to related descriptions in S1501, S1503 to S1505, and S1507 in the foregoing embodiments. Details are not described herein again.

In this embodiment of this application, the terminal device may perform time annotation on the text corresponding to the target audio, to obtain an accurate annotation file. For other technical effects in this embodiment of this application, refer to related descriptions in the foregoing embodiments.

Figure 18:
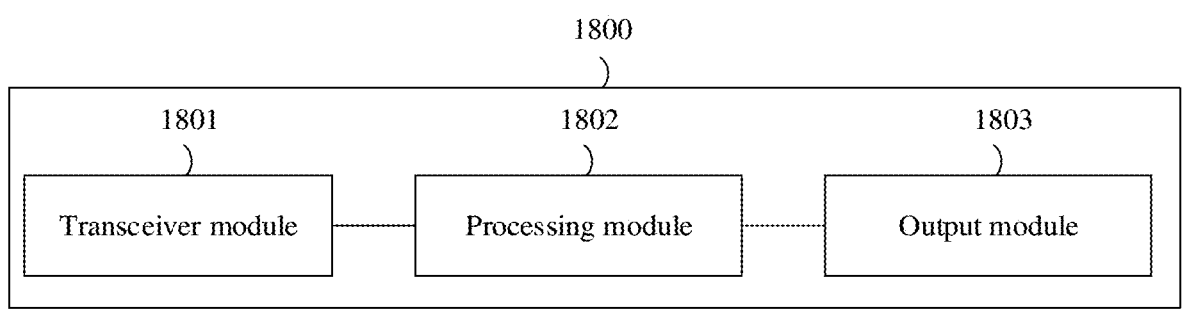
FIG. 18 is a schematic diagram of a structure of a text time annotation apparatus according to an embodiment of this application.

FIG. 18 is a schematic diagram of a structure of a text time annotation apparatus according to an embodiment of this application. The text time annotation apparatus may be the server or the terminal device in the foregoing embodiments. The text time annotation apparatus is configured to perform an action of the server or the terminal device in the foregoing method embodiments. As shown in FIG. 18, the text time annotation apparatus 1800 may include a transceiver module 1801, a processing module 1802, and an output module 1803.

The transceiver module 1801 is configured to receive an annotation request. The annotation request is used to request to annotate a playing start-end time period of each text unit in a text corresponding to target audio, and the text unit is at least one of the following: a character, a word, or an expression.

The processing module 1802 is configured to: obtain a playing start-end time period of each text unit in the target audio based on a fundamental frequency of the target audio, and annotate the playing start-end time period of each text unit in the text based on the playing start-end time period of each text unit in the target audio, to obtain an annotation file.

The output module 1803 is configured to output the annotation file.

In a possible implementation, the processing module 1802 is specifically configured to obtain the playing start-end time period of each text unit in the target audio based on the fundamental frequency of the target audio and short-time energy of the target audio.

In a possible implementation, the target audio includes at least one sub-audio segment. The processing module 1802 is specifically configured to: obtain, based on a fundamental frequency of the sub-audio segment, a first moment at which a change rate of the fundamental frequency of the sub-audio segment is greater than a change rate threshold; if a quantity of first moments is greater than or equal to a quantity of text units in a text corresponding to the sub-audio segment, obtain a second moment from the first moment based on short-time energy of the sub-audio segment, where an average value of short-time energy between two adjacent second moments is less than a first short-time energy threshold; and obtain a playing start-end time period of each text unit in the sub-audio segment based on the first moment and the second moment, to obtain the playing start-end time period of each text unit in the target audio.

In a possible implementation, a third moment is a moment other than the second moment in the first moment. The processing module 1802 is specifically configured to: obtain at least one second moment group of the sub-audio segment in an early-to-late order of the third moment and the second moment, where the second moment group includes at least two consecutive second moments, and a moment adjacent to the second moment group is the third moment; use each of each third moment and each second moment group as one moment unit, to obtain a plurality of moment units; and obtain, in an early-to-late order of moment units, the playing start-end time period of each text unit in the sub-audio segment.

In a possible implementation, the processing module 1802 is specifically configured to: in the early-to-late order of moment units, if a moment in an $i^{th}$ moment unit is a third moment, use the third moment in the $i^{th}$ moment unit as a playing end time point of an $i^{th}$ text unit and a playing start time point of an $(i+1)^{th}$ text unit in the sub-audio segment; and if the moment in the $i^{th}$ moment unit is a second moment group, use an earliest second moment in the second moment group in the $i^{th}$ moment unit as the playing end time point of the $i^{th}$ text unit in the sub-audio segment, and use a latest second moment in the second moment group in the $i^{th}$ moment unit as the playing start time point of the $(i+1)^{th}$ text unit in the sub-audio segment. Herein, i is an integer greater than or equal to 1.

In a possible implementation, the annotation request includes the target audio, and the target audio is audio of a human voice; or the annotation request includes initial audio, and the initial audio includes audio of a non-human voice and audio of a human voice. The processing module 1802 is further configured to: extract the audio of the human voice from the initial audio, and use the audio of the human voice as the target audio.

In a possible implementation, the processing module 1802 is specifically configured to input the initial audio into a human voice recognition model, to obtain audio of the human voice obtained after the audio of the non-human voice is removed.

In a possible implementation, the processing module 1802 is further configured to: if the annotation request includes an identifier of the target audio, query, based on the identifier of the target audio, whether a database includes the text corresponding to the target audio; or if the annotation request does not include an identifier of the target audio, query, based on an audio fingerprint of the target audio, whether a database includes the text corresponding to the target audio; and if the database does not include the text corresponding to the target audio, recognize the target audio by using a speech recognition technology, to obtain the text corresponding to the target audio.

In a possible implementation, the target audio includes the at least one sub-audio segment, and the text corresponding to the target audio includes a text corresponding to the at least one sub-audio segment. The processing module 1802 is specifically configured to annotate the playing start-end time period of each text unit in the sub-audio segment in each text unit in the text corresponding to the sub-audio segment, to obtain the annotation file.

In a possible implementation, the processing module 1802 is further configured to: obtain at least one first time length in which short-time energy is less than a second short-time energy threshold in the target audio; and segment the target audio based on a playing moment corresponding to a second time length that is greater than a preset time length in the first time length, to obtain the at least one sub-audio segment.

In a possible implementation, the electronic device is a server, and the transceiver module 1801 is specifically configured to receive the annotation request from the terminal device. The output module 1803 is specifically configured to send the annotation file to the terminal device.

In a possible implementation, the electronic device is a terminal device, and the transceiver module 1801 is specifically configured to: receive a playing request that is of the target audio and that is entered by a user, where the playing request is used to request to annotate the playing start-end time period of each text unit in the text corresponding to the target audio and play the target audio; and when the target audio is played, each text unit in the text is rendered and displayed based on the playing start-end time period of each text unit in the text corresponding to the target audio.

The output module 1803 is specifically configured to: play the target audio, and display the text corresponding to the target audio; and render and display a target text unit in the target audio based on the annotation file when the target text unit is played.

An implementation principle and a technical effect of the text time annotation apparatus provided in this embodiment of this application are similar to those of the server or the terminal device in the foregoing embodiments. Details are not described herein again.

It should be noted that the processing unit may be implemented in a form of invoking software by a processing element, or may be implemented in a form of hardware. For example, the processing unit may be a separately disposed processing element, or may be integrated into a chip of the apparatus for implementation. In addition, the processing unit may be stored in a memory of the apparatus in a form of program code, and a processing element of the apparatus invokes and executes a function of the processing module. In addition, all or some of these units may be integrated together, or may be implemented independently. The processing element may be an integrated circuit and has a signal processing capability. In an implementation process, steps in the foregoing methods or the foregoing modules can be implemented by using a hardware integrated logical circuit in the processing element, or by using instructions in a form of software. For example, the units may be one or more integrated circuits configured to implement the foregoing methods, for example, one or more application-specific integrated circuits (application specific integrated circuit, ASIC), or one or more microprocessors (digital signal processor, DSP), or one or more field programmable gate arrays (field programmable gate array, FPGA). For another example, when a specific module is implemented in a form of scheduling program code by the processing element, the processing element may be a general-purpose processor, for example, a central processing unit (central processing unit, CPU) or another processor that may invoke the program code. For another example, the units may be integrated together and implemented in a form of a system-on-a-chip (system-on-a-chip, SOC).

Figure 19:
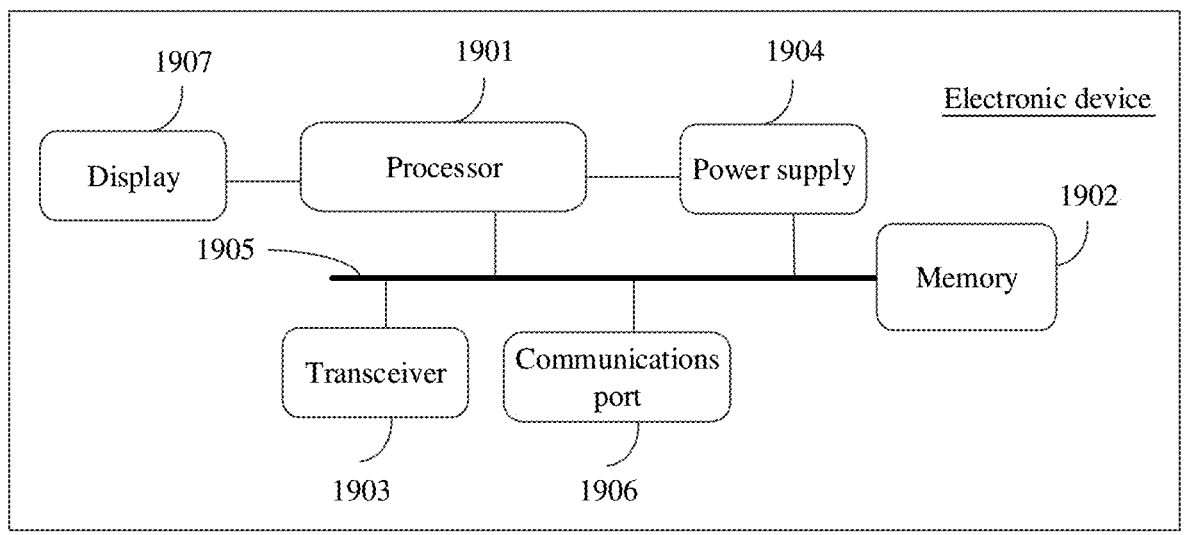
FIG. 19 is a schematic diagram of a structure of an electronic device according to an embodiment of this application.

FIG. 19 is a schematic diagram of a structure of an electronic device according to an embodiment of this application. The electronic device shown in FIG. 19 may be a to-be-charged device in the foregoing embodiments. As shown in FIG. 19, the electronic device may include a processor 1901, a memory 1902, and a transceiver 1903. The memory 1902 may include a high-speed random access memory (random-access memory, RAM), or may further include a nonvolatile memory (non-volatile memory, NVM), for example, at least one magnetic disk memory. The memory 1902 may store various instructions, to complete various processing functions and implement method steps in this application. The transceiver 1903 may be coupled to the processor 1901, and the processor 1901 may control implementing of an action of sending and receiving information between the electronic device and another electronic device. When the processor 1901 executes instructions, the instructions enable the processor 1901 of the electronic device to perform a processing action of the electronic device in the foregoing method embodiments, and enable the transceiver 1903 to perform a receiving/sending action of the electronic device in the foregoing method embodiments. Optionally, the electronic device in this application may further include a power supply 1904, a communications bus 1905, a communications port 1906, and a display 1907. The communications bus 1905 is configured to implement a communicative connection between components. The display 1907 is configured to display a user interface of the electronic device. The communications port 1906 is configured to implement connection and communication between the electronic device and another peripheral. In this embodiment of this application, the memory 1902 is configured to store computer-executable program code, and the program code includes instructions.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium, or may be transmitted from one computer-readable storage medium to another computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

The term "a plurality of" in this specification refers to two or more. The term "and/or" in this specification describes only an association relationship for describing associated objects and represents that three relationships may exist. For example, A and/or B may represent the following three cases: Only A exists, both A and B exist, and only B exists. In addition, a character "/" in this specification usually indicates an "or" relationship between associated objects, and a character "/" in a formula usually indicates a "divisible" relationship between associated objects.

It may be understood that various numbers in embodiments of this application are merely used for differentiation for ease of description, and are not used to limit the scope of embodiments of this application. It should be understood that sequence numbers of the foregoing processes do not mean execution sequences in embodiments of this application. The execution sequences of the processes should be determined according to functions and internal logic of the processes, and should not be construed as any limitation on the implementation processes of embodiments of this application. The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    receiving, by an electronic device, an annotation request, wherein the annotation request is used to request to annotate a playing start-end time period of each text unit in a text corresponding to a target audio, and wherein each text unit is at least a character, a word or an expression;
    obtaining, by the electronic device, the playing start-end time period of each text unit in the text corresponding to the target audio based on a fundamental frequency of the target audio;
    obtaining, by the electronic device, an annotation file based on annotating the playing start-end time period of each text unit in the text based on the playing start-end time period of each text unit in the text corresponding to the target audio; and
    outputting, by the electronic device, the annotation file,
    wherein obtaining the playing start-end time period of each text unit in the text corresponding to the target audio based on the fundamental frequency of the target audio comprises obtaining a first moment at which a change rate of the fundamental frequency is greater than a change rate threshold, the first moment indicating an interval moment between two adjacent text units in the text corresponding to the target audio,
    wherein obtaining the playing start-end time period of each text unit in the text corresponding to the target audio based on the fundamental frequency of the target audio further comprises obtaining the playing start-end time period of each text unit in the text corresponding to the target audio based on the fundamental frequency of the target audio and short-time energy of the target audio,
    wherein the target audio comprises at least one sub-audio segment,
    wherein obtaining the first moment at which the change rate of the fundamental frequency is greater than a change rate threshold comprises obtaining, based on a fundamental frequency of the sub-audio segment, a moment at which the change rate of the fundamental frequency is greater than a change rate threshold in the sub-audio segment, and
    wherein obtaining the playing start-end time period of each text unit in the text corresponding to the target audio based on the fundamental frequency of the target audio and the short-time energy of the target audio further comprises:
    obtaining a second moment from the first moment based on short-time energy of the sub-audio segment when a quantity of first moments is greater than or equal to a quantity of text units in a text corresponding to the sub-audio segment, wherein an average value of the short-time energy between two adjacent second moments is less than a first short-time energy threshold; and
    obtaining the playing start-end time period of each text unit in the text corresponding to the target audio based on obtaining a playing start-end time period of each text unit in the text corresponding to the sub-audio segment based on the first moment and the second moment.

2. The method according to claim 1,
    wherein a third moment is a moment other than the second moment in the first moment, and
    wherein obtaining the playing start-end time period of each text unit in the text corresponding to the sub-audio segment based on the first moment and the second moment comprises:
    obtaining at least one second moment group of the sub-audio segment in an early-to-late order of the third moment and the second moment, wherein the second moment group comprises at least two consecutive second moments, and a moment adjacent to the second moment group is the third moment;
    using each third moment and each second moment group each as one moment unit, to obtain a plurality of moment units; and
    obtaining, in an early-to-late order of moment units, the playing start-end time period of each text unit in the text corresponding to the sub-audio segment.

3. The method according to claim 2, wherein obtaining, in the early-to-late order of moment units, the playing start-end time period of each text unit in the text corresponding to the sub-audio segment comprises:
    in the early-to-late order of moment units,
    when a moment in an $i^{th}$ moment unit is a third moment, using the third moment in the $i^{th}$ moment unit as a playing end time point of an $i^{th}$ text unit and a playing start time point of an $(i+1)^{th}$ text unit in the text corresponding to the sub-audio segment, wherein i is an integer greater than or equal to 1, and
    when the moment in the $i^{th}$ moment unit is a second moment group, using an earliest second moment in the second moment group in the $i^{th}$ moment unit as the playing end time point of the $i^{th}$ text unit in the text corresponding to the sub-audio segment, and using a latest second moment in the second moment group in the $i^{th}$ moment unit as the playing start time point of the $(i+1)^{th}$ text unit in the text corresponding to the sub-audio segment.

4. The method according to claim 1,
wherein the annotation request comprises the target audio and the target audio is audio of a human voice, or
wherein the annotation request comprises an initial audio and the initial audio comprises audio of a non-human voice and audio of the human voice,
wherein the method further comprises extracting the audio of the human voice from the initial audio and using the audio of the human voice as the target audio.

5. The method according to claim 4, wherein extracting the audio of the human voice from the initial audio comprises inputting the initial audio into a human voice recognition model to obtain audio of the human voice obtained after the audio of the non-human voice is removed.

6. The method according to claim 1, wherein, before obtaining the playing start-end time period of each text unit in the text corresponding to the target audio based on the fundamental frequency of the target audio, the method further comprises:
when the annotation request comprises an identifier of the target audio, querying, based on the identifier of the target audio, whether a database comprises the text corresponding to the target audio; or
when the annotation request does not comprise the identifier of the target audio, querying, based on an audio fingerprint of the target audio, whether the database comprises the text corresponding to the target audio; and
when the database does not comprise the text corresponding to the target audio, recognizing the target audio, by using a speech recognition technology, to obtain the text corresponding to the target audio.

7. The method according to claim 1,
wherein the text corresponding to the target audio comprises a text corresponding to the at least one sub-audio segment,
wherein obtaining the annotation file based on annotating the playing start-end time period of each text unit in the text based on the playing start-end time period of each text unit in the text corresponding to the target audio comprises obtaining the annotation file based on annotating the playing start-end time period of each text unit in the sub-audio segment in a text corresponding to the sub-audio segment.

8. The method according to claim 7, further comprising:
obtaining at least one first time length in which short-time energy is less than a second short-time energy threshold in the target audio; and
obtaining the at least one sub-audio segment based on segmenting the target audio based on a playing moment corresponding to a second time length that is greater than a preset time length in the first time length.

9. The method according to claim 1,
wherein the electronic device is a server,
wherein receiving the annotation request comprises receiving the annotation request from a terminal device, and
wherein outputting the annotation file comprises sending the annotation file to the terminal device.

10. The method according to claim 1,
wherein the electronic device is a terminal device,
wherein the receiving the annotation request comprises receiving a playing request that is of the target audio and that is entered by a user,
wherein the playing request is used to request to annotate the playing start-end time period of each text unit in the text corresponding to the target audio and play the target audio,
wherein, when the target audio is played, each text unit in the text is rendered and displayed based on the playing start-end time period of each text unit in the text corresponding to the target audio, and
wherein outputting the annotation file comprises:
playing the target audio,
displaying the text corresponding to the target audio, and
rendering and displaying a target text unit in the target audio based on the annotation file when the target text unit is played.

11. An electronic device comprising:
a memory;
at least one processor; and
a transceiver,
wherein the at least one processor is coupled to the memory and the transceiver and configured for:
receiving an annotation request, wherein the annotation request is used to request to annotate a playing start-end time period of each text unit in a text corresponding to target audio, wherein each text unit is at least a character, a word or an expression;
obtaining a playing start-end time period of each text unit in the text corresponding to the target audio based on a fundamental frequency of the target audio;
obtaining an annotation file based on annotating the playing start-end time period of each text unit in the text based on the playing start-end time period of each text unit in the text corresponding to the target audio;
outputting the annotation file; and
controlling the transceiver to perform message receiving and message sending,
wherein obtaining the playing start-end time period of each text unit in the text corresponding to the target audio based on the fundamental frequency of the target audio comprises obtaining a first moment at which a change rate of the fundamental frequency is greater than a change rate threshold, the first moment indicating an interval moment between two adjacent text units in the text corresponding to the target audio,
wherein obtaining the playing start-end time period of each text unit in the text corresponding to the target audio based on the fundamental frequency of the target audio further comprises obtaining the playing start-end time period of each text unit in the text corresponding to the target audio based on the fundamental frequency of the target audio and short-time energy of the target audio,
wherein the target audio comprises at least one sub-audio segment,
wherein obtaining the first moment at which the change rate of the fundamental frequency is greater than a change rate threshold comprises obtaining, based on a fundamental frequency of the sub-audio segment, a moment at which the change rate of the fundamental frequency is greater than a change rate threshold in the sub-audio segment, and wherein obtaining the playing start-end time period of each text unit in the text corresponding to the target audio based on the fundamental frequency of the target audio and short-time energy of the target audio further comprises:
when a quantity of first moments is greater than or equal to a quantity of text units in a text corresponding to the sub-audio segment, obtaining a second moment from the first moment based on short-time energy of the sub-audio segment, wherein an average value of the short-time energy between two adjacent second moments is less than a first short-time energy threshold, and
obtaining the playing start-end time period of each of the text unit in the text corresponding to the target audio based on obtaining a playing start-end time period of each text unit in the text corresponding to the sub-audio segment based on the first moment and the second moment.

12. The electronic device according to claim 11, wherein a third moment is a moment other than the second moment in the first moment, and
wherein obtaining the playing start-end time period of each text unit in the text corresponding to the sub-audio segment based on the first moment and the second moment comprises:
obtaining at least one second moment group of the sub-audio segment in an early-to-late order of the third moment and the second moment, wherein the second moment group comprises at least two consecutive second moments, and wherein a moment adjacent to the second moment group is the third moment,
obtaining a plurality of moment units by using each third moment and each second moment group each as one moment unit, and
obtaining, in an early-to-late order of moment units, the playing start-end time period of each text unit in the text corresponding to the sub-audio segment.

13. The electronic device according to claim 11, wherein the annotation request comprises the target audio and the target audio is audio of a human voice, or
wherein the annotation request comprises an initial audio and the initial audio comprises audio of a non-human voice and audio of the human voice, and
wherein the at least one processor is further configured for extracting the audio of the human voice from the initial audio, and using the audio of the human voice as the target audio.

14. The electronic device according to claim 13, wherein extracting the audio of a human voice from an initial audio comprises obtaining the audio of the human voice obtained after the audio of a non-human voice is removed based on inputting the initial audio into a human voice recognition model.

15. A non-transitory computer-readable storage medium, wherein the storage medium stores programming to be executed by a computer, and wherein the programming comprises instructions for
receiving an annotation request, wherein the annotation request is used to request to annotate a playing start-end time period of each text unit in a text corresponding to target audio, and wherein each text unit is at least a character, a word or an expression;
obtaining a playing start-end time period of each text unit in the text corresponding to the target audio based on a fundamental frequency of the target audio;
obtaining an annotation file based on annotating the playing start-end time period of each text unit in the text based on the playing start-end time period of each text unit in the text corresponding to the target audio; and
outputting the annotation file,
wherein obtaining the playing start-end time period of each text unit in the text corresponding to the target audio based on the fundamental frequency of the target audio comprises obtaining a first moment at which a change rate of the fundamental frequency is greater than a change rate threshold, the first moment indicating an interval moment between two adjacent text units in the text corresponding to the target audio,
wherein obtaining the playing start-end time period of each text unit in the text corresponding to the target audio based on the fundamental frequency of the target audio further comprises obtaining the playing start-end time period of each text unit in the text corresponding to the target audio based on the fundamental frequency of the target audio and short-time energy of the target audio,
wherein the target audio comprises at least one sub-audio segment,
wherein obtaining the first moment at which the change rate of the fundamental frequency is greater than a change rate threshold comprises obtaining, based on a fundamental frequency of the sub-audio segment, a moment at which the change rate of the fundamental frequency is greater than a change rate threshold in the sub-audio segment, and
wherein obtaining the playing start-end time period of each text unit in the text corresponding to the target audio based on the fundamental frequency of the target audio and short-time energy of the target audio further comprises:
when a quantity of first moments is greater than or equal to a quantity of text units in a text corresponding to the sub-audio segment, obtaining a second moment from the first moment based on short-time energy of the sub-audio segment, wherein an average value of the short-time energy between two adjacent second moments is less than a first short-time energy threshold, and
obtaining the playing start-end time period of each of the text unit in the text corresponding to the target audio based on obtaining a playing start-end time period of each text unit in the text corresponding to the sub-audio segment based on the first moment and the second moment.

16. The non-transitory computer readable storage medium according to claim 15,
wherein a third moment is a moment other than the second moment in the first moment, and
wherein the instructions for obtaining the playing start-end time period of each text unit in the text corresponding to the sub-audio segment based on the first moment and the second moment further comprise instructions for:
obtaining at least one second moment group of the sub-audio segment in an early-to-late order of the third moment and the second moment, wherein the second moment group comprises at least two consecutive second moments, and a moment adjacent to the second moment group is the third moment;

using each third moment and each second moment group each as one moment unit, to obtain a plurality of moment units; and obtaining, in an early-to-late order of moment units, the playing start-end time period of each text unit in the text corresponding to the sub-audio segment.

17. The non-transitory computer readable storage medium according to claim 16, wherein the instructions for obtaining, in the early-to-late order of moment units, the playing start-end time period of each text unit in the text corresponding to the sub-audio segment further comprise instructions for:

in the early-to-late order of moment units, when a moment in an $i^{th}$ moment unit is a third moment, using the third moment in the $i^{th}$ moment unit as a playing end time point of an $i^{th}$ text unit and a playing start time point of an $(i+1)^{th}$ text unit in the text corresponding to the sub-audio segment, wherein i is an integer greater than or equal to 1, and when the moment in the $i^{th}$ moment unit is a second moment group, using an earliest second moment in the second moment group in the $i^{th}$ moment unit as the playing end time point of the $i^{th}$ text unit in the text corresponding to the sub-audio segment, and using a latest second moment in the second moment group in the $i^{th}$ moment unit as the playing start time point of the $(i+1)^{th}$ text unit in the text corresponding to the sub-audio segment.

18. The non-transitory computer readable storage medium according to claim 15, wherein the annotation request comprises the target audio and the target audio is audio of a human voice, or wherein the annotation request comprises an initial audio and the initial audio comprises audio of a non-human voice and audio of the human voice, wherein the programming further comprises instructions for extracting the audio of the human voice from the initial audio and using the audio of the human voice as the target audio.

19. The non-transitory computer readable storage medium according to claim 18, wherein the instructions for extracting the audio of the human voice from the initial audio comprises instructions for inputting the initial audio into a human voice recognition model to obtain audio of the human voice obtained after the audio of the non-human voice is removed.

* * * * *